(12) United States Patent
Culver et al.

(10) Patent No.: US 8,256,037 B1
(45) Date of Patent: *Sep. 4, 2012

(54) LOCKABLE ASSEMBLY FOR URINAL FLUSH VALVES

(75) Inventors: Jeffrey A. Culver, Sylvania, OH (US); John E. Mitchell, Temperance, MI (US)

(73) Assignee: Betco Corporation, Toledo, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/404,420

(22) Filed: Feb. 24, 2012

Related U.S. Application Data

(63) Continuation-in-part of application No. 13/289,694, filed on Nov. 4, 2011.

(60) Provisional application No. 61/410,550, filed on Nov. 5, 2010.

(51) Int. Cl.
*E03D 13/00* (2006.01)

(52) U.S. Cl. .......................................... 4/301

(58) Field of Classification Search ........... 4/301, 144.1, 4/302–352
See application file for complete search history.

(56) References Cited

U.S. PATENT DOCUMENTS

| | | | |
|---|---|---|---|
| 2,507,966 A | 5/1950 | Filliung, Jr | |
| 3,373,449 A | 3/1968 | Rusnok | |
| 3,556,137 A | 1/1971 | Billeter | |
| 4,868,931 A | 9/1989 | Schneeweiss | |
| 5,195,558 A | 3/1993 | Liang | |
| 5,680,879 A | 10/1997 | Sheih et al. | |
| 5,802,626 A | 9/1998 | Bedana | |
| 5,884,667 A * | 3/1999 | North | 138/43 |
| 6,041,809 A | 3/2000 | Johnson | |
| 6,560,790 B2 | 5/2003 | Saar et al. | |
| 6,643,853 B2 | 11/2003 | Wilson et al. | |
| 6,671,893 B1 | 1/2004 | Quintana et al. | |
| 6,871,835 B2 | 3/2005 | Parsons | |
| 6,877,170 B1 * | 4/2005 | Quintana et al. | 4/427 |
| 7,111,332 B1 | 9/2006 | Hsia | |
| 7,293,583 B2 * | 11/2007 | Arigoni | 137/624.11 |
| 7,396,000 B2 * | 7/2008 | Parsons et al. | 251/129.04 |
| 7,549,436 B2 * | 6/2009 | Parsons et al. | 137/15.18 |
| 2006/0162788 A1 | 7/2006 | Arigoni | |
| 2006/0202138 A1 | 9/2006 | Yeh | |

\* cited by examiner

*Primary Examiner* — Lori Baker

(74) *Attorney, Agent, or Firm* — MacMillan, Sobanski & Todd, LLC

(57) ABSTRACT

A lockable assembly for a urinal valve is provided. The lockable assembly includes a shaft assembly configured to displace portions of the urinal valve and a housing body configured to connect to the urinal valve and further configured to support the shaft assembly. The lockable assembly is configured to allow selective operation of the urinal valve between an unlocked flushable state and a locked non-flushable state. In the locked non-flushable state, the shaft assembly is prevented from displacing portions of the urinal valve and in the unlocked flushable state, the shaft assembly is configured to displace portions of the urinal valve to allow a flow of water to pass through the urinal valve.

20 Claims, 14 Drawing Sheets

LOCKABLE ASSEMBLY FOR URINAL FLUSH VALVES

RELATED APPLICATIONS

This application is a continuation-in-part of pending U.S. patent application Ser. No. 13/289,694, filed Nov. 4, 2011, which claimed the benefit of U.S. Provisional Application No. 61/410,550, filed Nov. 5, 2010, the disclosures of which are incorporated herein by reference.

BACKGROUND

Urinals can include conventional flush valves actuated by levers. The levers can result in a flush of the urinal for each actuation of the lever. In some instances, the urinals can be used extensively, resulting in a large water usage. It would be advantageous if urinal flush valves could be improved to better control the use of water.

SUMMARY OF THE INVENTION

The above objects, as well as other objects not specifically enumerated, are achieved by a lockable assembly for a urinal valve. The lockable assembly includes a shaft assembly configured to displace portions of the urinal valve and a housing body configured to connect to the urinal valve and further configured to support the shaft assembly. The lockable assembly is configured to allow selective operation of the urinal valve between an unlocked flushable state and a locked non-flushable state. In the locked non-flushable state, the shaft assembly is prevented from displacing portions of the urinal valve and in the unlocked flushable state; the shaft assembly is configured to displace portions of the urinal valve to allow a flow of water to pass through the urinal valve.

According to this invention there is also provided a urinal including a receptacle configured to collect fluids, a valve in fluid communication with the receptacle, the valve configured to provide a flushing system for rinsing fluids from surfaces of the receptacle and a lockable assembly engaged with portions of the valve. The lockable assembly has a shaft assembly configured to displace portions of the valve and a housing body configured to connect to the valve and further configured to support the shaft assembly. The lockable assembly is configured to allow selective operation of the valve between an unlocked flushable state and a locked non-flushable state. In the locked non-flushable state, the shaft assembly is prevented from displacing portions of the valve and in an unlocked flushable state; the shaft assembly is configured to displace portions of the valve to allow a flow of water to pass through the valve and into the urinal.

According to this invention there is also provided a method of controlling the flush valve of a urinal including the steps of engaging the flush valve with a lockable assembly, the lockable assembly having a shaft assembly configured to displace portions of the flush valve and controlling the operation of the lockable assembly between a manually-operable flushable state and a locked non-flushable state, wherein in the locked non-flushable state, the shaft assembly is prevented from displacing portions of the flush valve and in the flushable state the shaft assembly is configured to displace portions of the flush valve to allow a flow of water to pass through the flush valve.

Various objects and advantages of the lockable assembly for a flush valve will become apparent to those skilled in the art from the following detailed description of the preferred embodiment, when read in light of the accompanying drawings.

DETAILED DESCRIPTION OF THE INVENTION

The present invention will now be described with occasional reference to the specific embodiments of the invention. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise.

Unless otherwise indicated, all numbers expressing quantities of dimensions such as length, width, height, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the present invention. Notwithstanding that the numerical ranges and parameters setting forth the broad scope of the invention are approximations, the numerical values set forth in the specific examples are reported as precisely as possible. Any numerical values, however, inherently contain certain errors necessarily resulting from error found in their respective measurements.

The description and figures disclose a lockable assembly for a urinal flush valve. Generally, the lockable assembly is configured to replace mechanisms for actuating the flushing action of a urinal. Non-limiting examples of actuation mechanisms include lever-operated assemblies, push buttons and automatic or sensor actuated mechanisms. The lockable assembly thereby allows selective operation of the urinal flush valve between a manually-operable flushable state and a locked non-flushable state. The term "urinal," as used herein, is defined to mean a receptacle used by males for urinating. The term "flush," as used herein, is defined to rinse through a sudden rush of water. The term "valve," as used herein, is defined to mean any structure, mechanism or device configured to control the flow of a fluid. The term "lockable," as used herein, is defined to mean having a structure capable of being locked.

Figure 1:
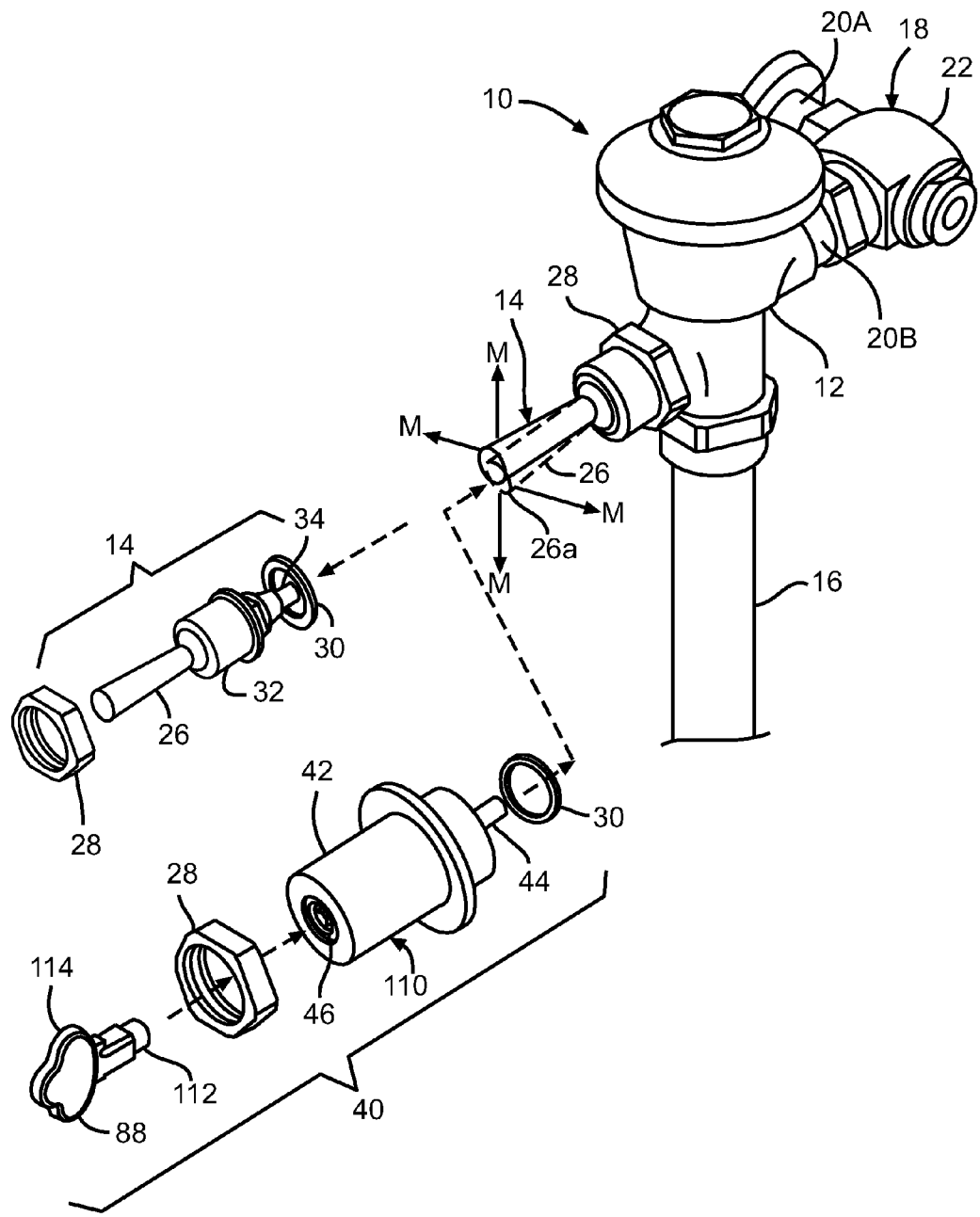
FIG. 1 is a perspective view of a conventional flush valve for a urinal having a lever assembly replaced by a lockable assembly.

Referring now to FIG. 1, a conventional lever-operated flush valve (hereafter "valve") for a urinal is shown generally at 10. Generally, the valve 10 is configured to provide a flushing system for rinsing urine or other fluids from surfaces of the urinal (not shown) upon a manual activation. In certain embodiments, the valve 10 can be a diaphragm type of valve. In other embodiments, the valve 10 can be a piston type of valve. In still other embodiments, the valve 10 can have other types of structures and mechanisms. The valve 10 includes a valve body 12, a lever assembly 14, a sparge pipe 16 and a water inlet assembly 18.

Referring again to the embodiment shown in FIG. 1, the water inlet assembly 18 includes conduits 20A and 20B and one or more couplings 22. The conduits 20A and 20B are configured to channel a flow of water from a water source (not shown) to the valve body 12. In the illustrated embodiment, the conduits 20A and 20B are water pipes. However, in other embodiments, the conduits 20A and 20B can be other structures. The coupling 22 is configured to connect the conduits 20A and 20B together. In the illustrated embodiment, the coupling 22 is a plumbing elbow. Alternatively, the coupling 22 can be other desired structures or fittings, such as for example an adjustment control valve, sufficient to connect the conduits 20A and 20B together. While the illustrated embodiment of the water inlet assembly 18 includes conduits 20A and 20B and one or more couplings 22, it should be appreciated that in other embodiments, the water inlet assembly 18 can include any quantity and type of plumbing fixtures, fittings and/or structures sufficient to channel a flow of water from a water source to the valve body 12.

Referring again to FIG. 1, the lever assembly 14 includes a lever 26, a fastener 28, a sealing member 30, a housing 32 and an actuation piston 34. The lever assembly 14 is conventional in the art and will only be described briefly for purposes of clarification.

Referring again to FIG. 1, in an installed position, the lever assembly 14 is connected to the valve body 12 by the fastener 28, such that the lever 26 extends in a direction away from the valve body 12 and the actuation piston 34 extends into the valve body 12. As indicated in FIG. 1, a first end 26a of the lever 26 is configured for movement in any direction as indicated by the plurality of arrows M. Movement of the first end 26a of the lever 26 causes the actuation piston 34 to move in an axial direction further into the interior of the valve body 12, thereby resulting in actuation of a valve (not shown), also positioned within the interior of the valve body 12. Actuation of the valve results in a flow or flush of water through the sparge pipe 16 and into the urinal (not shown). In some embodiments, the valve positioned within the interior of the valve body 12 includes the structure of a valve head connected to a valve stem, wherein movement of the actuation piston 34 against the valve stem causes displacement of the valve stem and subsequent displacement of the valve head from a valve seat. However, the valve positioned within the interior of the valve body 12 can have other structures or mechanisms and can operate in other manners.

As shown in FIG. 1, the sparge pipe 16 is configured to channel a flow of water from the valve body 12 to the urinal (not shown). In the illustrated embodiment, the sparge pipe 16 is a water pipe. However in other embodiments, the sparge pipe 16 can be other structures suitable to channel a flow of flush water from the valve body 12 to the urinal (not shown). While the embodiment shown in FIG. 1 illustrates a sparge pipe 16 as having a substantially uniform diameter along its length, it should be appreciated that in other embodiments, the sparge pipe 16 can have a non-uniform diameter along its length.

Referring again to FIG. 1, in operation, the lever 26 actuates the flush valve 10, thereby causing a flow of flush water to exit the valve body 12 and pass through the sparge pipe 16 to the urinal. Accordingly, the flush valve 10 will cause a flow of flush water to the urinal each and every time the lever 26 is actuated. In some instances, excess manual actuation of the flush valve 10 can result in excess water usage and excess water cost.

Referring again to FIG. 1, the lever assembly 14 of the conventional lever-operated flush valve 10 can be replaced with a lockable assembly for a flush valve 40 (hereafter "lockable assembly"). The lockable assembly 40 is configured to convert the conventional lever-operated flush valve 10 into a flush valve that is selectively operable between a manually-operated flushable state and a locked non-flushable state. The term "selectively operable," as used herein, is defined to mean the lockable assembly 40 can be locked or unlocked, by a user, to provide the desired state. In the unlocked state, the lockable assembly 40 can allow the flush valve (not shown) positioned within the interior of the valve body 12 to be flushed by manual actuation. In the locked state, the flush valve positioned within the interior of the valve body 12 is prevented from flushing by the lockable assembly 40. The lockable feature of the lockable assembly 40 will be discussed in more detail below. The term "user," as used herein, is defined to mean personnel authorized to lock or unlock the lockable assembly 40. A non-limiting example of authorized personnel is facility operating personnel.

Figure 2:
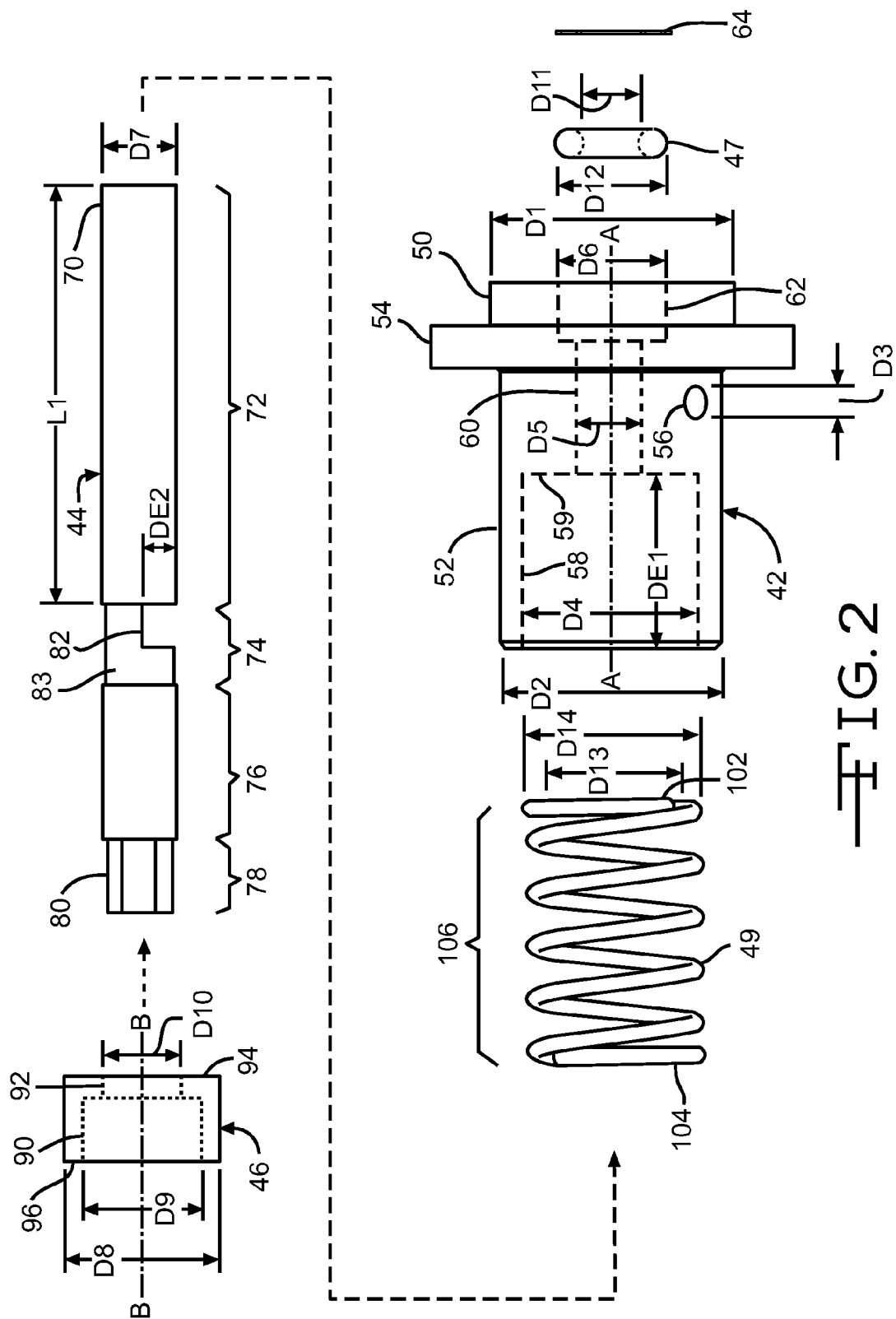
FIG. 2 is a side view, in elevation, of the components of the lockable assembly of FIG. 1.

Referring now to FIGS. 1 and 2, the components forming the lockable assembly 40 are illustrated. The lockable assembly 40 includes a housing body 42, an index pin 44, a retainer cap 46, a sealing member 47, a tension member 49 and a retainer 64.

Referring now to FIG. 2, portions of the housing body 42 are configured for insertion into the valve body 12 and other portions of the housing body 42 are configured as an enclosure for various components of the lockable assembly 40. The housing body 42 includes a first segment 50, a second segment 52 and a third segment 54 extending therebetween. The first segment 50, second segment 52 and third segment 54 are concentric about a major axis A.

Referring again to FIG. 2, the first segment 50 of the housing body 42 is configured for insertion into a corresponding opening (not shown) of the valve body 12. In the illustrated embodiment, the first segment 50 has a circular cross-sectional shape and has an outer diameter D1 of about 0.94 inches. In other embodiments, the first segment 50 can have other cross-sectional shapes and can have an outer diameter D1 of more or less than about 0.94 inches.

The second segment 52 of the housing body 42 is configured as an enclosure for various components of the lockable assembly 40. The second segment 52 includes a first internal passage 58, which will be discussed in more detail below. In the illustrated embodiment, the second segment 52 has a circular cross-sectional shape and has an outer diameter D2 of about 0.94 inches. In other embodiments, the second segment 52 can have other cross-sectional shapes and the outer diameter D2 can be more or less than about 0.94 inches, sufficient to include the first internal passage 58.

Figure 3:
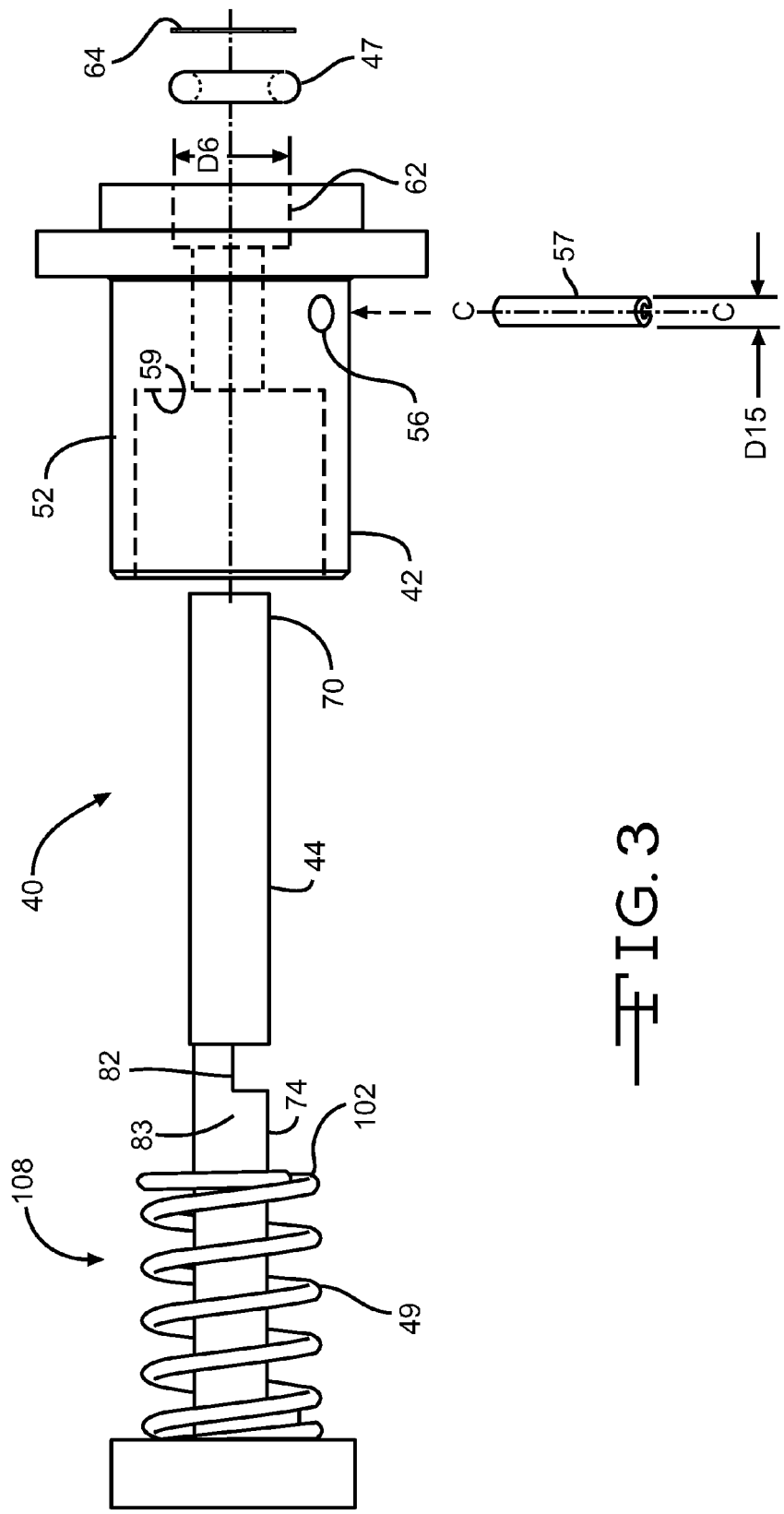
FIG. 3 is a side view, in elevation, of a shaft assembly and housing body forming the lockable assembly of FIG. 1.

The second segment 52 includes an aperture 56. The aperture 56 has an inner diameter D3 sufficient for retention of a locking pin 57 as shown in FIG. 3. Referring again to embodiment illustrated in FIG. 2, the aperture 56 has a circular cross-sectional shape and the inner diameter D3 is about 0.19 inches. In other embodiments, the aperture 56 can have other cross-sectional shapes and the inner diameter D3 can be more or less than about 0.19 inches sufficient for retention of the locking pin 57. The aperture 56 will be discussed in more detail below.

The third segment 54 of the housing body 42 extends in a radial direction from the housing body 42 and is configured as a flange for placement against a mating surface (not shown) of the valve body 12. The third segment 54 acts to limit the insertion depth of the first segment 50 of the housing body 42. In the illustrated embodiment, the third segment 54 has a circular cross-sectional shape. In other embodiments, the third segment 54 can have other cross-sectional shapes and can have any desired diameter sufficient to form a flange for placement against a mating surface (not shown) of the valve body 12.

Referring again to FIG. 2, the first internal passage 58, concentric with the major axis A, extends into the second segment 52 a depth DE1 such as to form a shoulder 59 within the second segment 52. The shoulder 59 will be discussed in more detail below. The first internal passage 58 has an inner diameter D4 sufficient to house the tension member 49. In the illustrated embodiment, the first internal passage 58 has a circular cross-sectional shape, a depth DE1 of about 0.77 inches and an inner diameter D4 of about 0.625 inches. In other embodiments, the first internal passage 58 can have other cross-sectional shapes, a depth DE1 of more or less than about 0.77 inches and an inner diameter D4 of more or less than about 0.625 inches.

A second internal passage 60, concentric with the major axis A, extends within the housing body 42 from the shoulder 59 formed by the first internal passage 58 into the third segment 54. The second internal passage 60 has an inner diameter D5 sufficient to allow insertion of the index pin 44 through the first, second and third segments, 50, 52 and 54, of the housing body 42 and further sufficient to allow axial movement of the index pin 44 relative to the housing body 42. In the illustrated embodiment, the second internal passage 60 has a circular cross-sectional shape and has an inner diameter D5 of about 0.252 inches. In other embodiments, the second internal passage 60 can have other cross-sectional shapes and the inner diameter D5 can be more or less than about 0.252 inches sufficient to allow insertion of the index pin 44 through the first, second and third segments, 50, 52 and 54, of the housing body 42 and further sufficient to allow axial movement of the index pin 44 relative to the housing body 42.

Referring again to FIG. 2, a third internal passage 62, concentric with the major axis A, extends within the housing body 42 from the second internal passage 60 through the first segment 50. The third internal passage 62 has an inner diameter D6 sufficient to contain the sealing member 47 and the retainer 64 and further sufficient to allow axial movement of the index pin 44 relative to the housing body 42. In the illustrated embodiment, the third internal passage 62 has a circular cross-sectional shape and has an inner diameter D6 of about 0.53 inches. In other embodiments, the third internal passage 62 can have other cross-sectional shapes and the inner diameter D6 can be more or less than about 0.53 inches sufficient to contain the sealing member 47 and the retainer 64 and further sufficient to allow axial movement of the index pin 44 relative to the housing body 42. The first, second and third internal passages, 58, 60 and 62, will be discussed in more detail below.

In the embodiment illustrated in FIG. 2, the housing body 42 is made from corrosion-resistant materials, such as the non-limiting examples of stainless steel or brass. However, in other embodiments, the housing body 42 can be made from other corrosion-resistant materials, such as for example, polyethylene. While the embodiment illustrated in FIG. 2 shows the housing body 42 as a one-piece structure, it should be appreciated that in other embodiments, the housing body 42 can be assembled from discrete components. The housing body 42 can have any desired surface finish including the non-limiting examples of chrome or cadmium plating.

Referring again to FIG. 2, the index pin 44 is configured for rotation relative to the housing body 42 and further configured for movement in an axial direction relative to the housing body 42. Rotational movement of the index pin 44 alternatively locks or unlocks the axial movement of the index pin 44 relative to the housing body 42. Axial movement of the index pin 44 in the direction toward the valve body 12 results in actuation of a valve (not shown) positioned within the interior of the valve body 12. The index pin 44 has an outer diameter D7. In the illustrated embodiment, the outer diameter D7 is about 0.25 inches. In other embodiments, the outer diameter D7 can be more or less than about 0.25 inches.

The index pin 44 includes a first end 70, an extension segment 72, a lock segment 74, an intermediate segment 76 and a key segment 78.

Referring again to FIG. 2, the first end 70 of the extension segment 72 has a shape of a substantially flat surface. The flat surface of the first end 70 is configured to engage portions of the flush valve, such as for example a valve stem, within the interior of the valve body 12. In other embodiments, the first end 70 of the index pin 44 can have other shapes, such as the non-limiting example of an arcuate shape, sufficient to engage portions of the flush valve within the interior of the valve body 12.

The extension segment 72 of the index pin 44 extends from the lock segment 74 to the first end 70 a length L1 sufficient to allow the first end 70 of the index pin 44 to engage portions of the flush valve within the interior of the valve body 12. In the illustrated embodiment, the length L1 is in a range of from about 0.80 inches to about 1.20 inches. In other embodiments, the length L1 can be less than about 0.80 inches or more than about 1.20 inches. In still other embodiments, such as for example when the valve body 12 or portions of the valve body 12 are concealed behind walls, the extension segment 72 can have a length L1 of about 10.0 inches to 16.0 inches or more.

Referring again to FIG. 2, the lock segment 74 extends from the extension segment 72 to the intermediate segment 76. The lock segment 74 includes a groove 82 adjacent a flat 83. As shown in FIG. 2, the groove 82 and a portion of the flat 83 are within the same vertical plane, with the groove 82 orientated at a generally perpendicular angle with the flat 83. Accordingly, when the index pin 44 is in an installed position within the housing body 42, the vertical plane containing the groove 82 and a portion of the flat 83 aligns with the locking pin 57. In this position, rotation of the index pin 44 is used to selectively engage or disengage the locking pin 57 with the groove 82 or with the flat 83. In one example, rotation of the index pin 44 engages the groove 82 with the locking pin 57 such as to prevent movement of the index pin 44 in an axial direction. In another example, rotation of the index pin 44 disengages the groove 82 with the locking pin 57 such that the locking pin 57 now aligns with the portion of the flat 83. In this position, the index pin 44 is capable of movement in an axial direction.

Referring again to FIG. 2, the groove 82 has a depth DE2 sufficient to allow engagement with the locking pin 57. In the illustrated embodiment, the depth DE2 is about 0.13 inches. Alternatively, the depth DE2 can be more or less than about 0.13 inches, provided the depth DE2 is sufficient to allow engagement with the locking pin 57.

While the embodiment illustrated in FIG. 2 shows the groove 82 as having a generally square cross-sectional shape, it should be appreciated that in other embodiments, the groove 82 can have other cross-sectional shapes, such as the non-limiting example of an arcuate cross-sectional shape, sufficient to engage the locking pin 57.

The key segment 78 extends from the intermediate segment 76 to a second end 80 of the index pin 44. The key segment 78 is configured to have a shape that cooperates with a shape of a portion of the key 88, as shown in FIG. 1, such that rotation of the key 88 forces rotation of the index pin 44. In the illustrated embodiment, the key segment 78 is formed such as to have a hexagonal cross-sectional shape, corresponding to a hexagonal shape of a portion of the key 88. However, in other embodiments, the key segment 78 can have other cross-sectional shapes, such as for example, square, rectangular, triangular or star cross-sectional shapes.

In the illustrated embodiment, the index pin 44 is made from corrosion-resistant materials, such as the non-limiting example of stainless steel. However, in other embodiments, the index pin 44 can be made from other corrosion-resistant materials, such as for example, brass or polyethylene. The index piston 44 can have any desired surface finish including the non-limiting examples of chrome or cadmium plating.

The retainer cap 46 is configured for attachment to the intermediate segment 76 of the index pin 44 and further configured for positioning within the inner diameter D4 of the first internal passage 58 of the housing body 42. In the illustrated embodiment, the retainer cap 46 has a circular cross-sectional shape and an outer diameter D8 of about 0.62 inches. In other embodiments, the retainer cap 46 can have other cross-sectional shapes, generally corresponding to the cross-sectional shape of the first passage 58 and can have an outer diameter D8 of more or less than about 0.62 inches.

The retainer cap 46 has a first internal passage 90 in communication with a second internal passage 92. The first internal passage 90 is configured to provide a circumferential clearance between the hexagonal cross-sectional shaped second end 80 of the index pin 44 and an interior surface of the first internal passage 90. In the illustrated embodiment, the first internal passage 90 has a circular cross-sectional shape and an inner diameter D9 of about 0.375 inches. In other embodiments, the first internal passage 90 can have other cross-sectional shapes and the inner diameter D9 can be more or less than about 0.375 inches, sufficient to provide a circumferential clearance between the hexagonal cross-sectional shaped second end 80 of the index pin 44 and an interior surface of the first internal passage 92.

The second internal passage 92 has a cross-sectional shape and an inner diameter D10 that generally corresponds to the cross-sectional shape of the index pin 44 and the outer diameter D7 of the index pin 44. In the illustrated embodiment, the second internal passage 92 has a circular cross-sectional shape and an inner diameter D10 of about 0.25 inches. In other embodiments, the second internal passage 92 can have other cross-sectional shapes and the diameter D10 can be more or less than about 0.25 inches, sufficient to generally correspond to the outer diameter D7 of the index pin 44.

The retainer cap 46 has a first end 94 and a second end 96. The first and second ends, 94 and 96, of the retainer cap 46 will be discussed in more detail below.

In the embodiment illustrated in FIG. 2, the retainer cap 46 is made from corrosion-resistant materials, such as the non-limiting examples of stainless steel or brass. However, in other embodiments, the retainer cap 46 can be made from other corrosion-resistant materials, such as for example, polyethylene. While the embodiment illustrated in FIG. 2 shows the retainer cap 46 as a one-piece structure, it should be appreciated that in other embodiments, the retainer cap 46 can be assembled from discrete components. The retainer cap 46 can have any desired surface finish including the non-limiting examples of chrome or cadmium plating.

Referring again to FIG. 2, the sealing member 47 is configured to seat over the extension segment 72 of the index pin 44 and further configured to seal against the interior surface of the third interior passage 62 of the housing body 42. The sealing member 47 has an inner diameter D11 that generally corresponds to the outer diameter D7 of the index pin 44 and an outer diameter D12 that generally corresponds to the inner diameter D6 of the third interior passage 62. In the illustrated embodiment, the inner diameter D11 is about 0.24 inches and the outer diameter D12 is about 0.385 inches. In other embodiments, the sealing member 47 can have an inner diameter D11 more or less than about 0.24 inches, sufficient to correspond to the outer diameter D7 of the index pin 44, and an outer diameter D12 more or less than about 0.385 inches, sufficient to correspond to the inner diameter D6 of the third interior passage 62.

In the embodiment illustrated in FIG. 2, the sealing member 47 is configured to seal water having pressures in a range of from about 40 pounds per square inch (psi) to about 180 psi. In other embodiments, the sealing member 47 can be configured to seal water pressures less than about 40 psi or more than about 180 psi. In the illustrated embodiment, the sealing member 47 is formed from a polymeric material, such as the non-limiting example of neoprene. Alternatively, in other embodiments the sealing member 47 can be formed from other desired materials, such as for example silicone-based materials.

While the embodiment illustrated in FIG. 2 shows a single sealing member 47, it should be appreciated that in other embodiments, more than one sealing member 47 can be used.

Referring again to FIG. 2, the tension member 49 has a first end 102, a second end 104 and an intermediate portion 106. As will be discussed in more detail below, the first end 102 has a substantially flat surface configured to seat against the shoulder 59 within the second segment 52 of the housing body 42. Similarly, the second end 104 of the tension member 49 has a substantially flat surface configured to seat against the first end 94 of the retainer cap 46. The intermediate portion 106 of the tension member 49 is configured for compression and expansion as will be discussed in more detail below.

The tension member 49 has an inner diameter D13 that generally corresponds to the outer diameter D7 of the index pin 44 and an outer diameter D14 that generally corresponds to the inner diameter D4 of the first passage 58. In the illustrated embodiment, the inner diameter D13 is about 0.510 inches and the outer diameter D14 is about 0.60 inches. In other embodiments, the inner diameter D13 can be more or less than about 0.510 inches, sufficient to correspond to the outer diameter D7 of the index pin 44, and the outer diameter D14 can be more or less than about 0.60 inches, sufficient to correspond to the inner diameter D4 of the first passage 58.

While the embodiment of the tension member 49 shown in FIG. 2 shows a helical spring, it should be appreciated that in other embodiments the tension member 49 can be other structures, mechanisms or devices, such as for example leaf springs, pneumatic springs or elastomeric fluids.

Referring now to FIGS. 2 and 3, assembly of the lockable assembly 40 will now be described. In a first step, the second internal passage 92 of the retainer cap 46 is aligned with the intermediate segment 76 of the index pin 44 such that the second end 80 of the index pin 44 aligns with the second end 96 of the retainer cap 46. In certain embodiments, the retainer cap 46 is retained in this position as the result of an interference fit between the retainer cap 46 and the index pin 44. In other embodiments, the retainer cap 46 can be retained in this position with other methods, including the non-limiting examples of adhesive or brazing. In a next step, the first end 70 of the index pin 44 is slid through the tension member 49 such that the second end 104 of the tension member 49 seats against the first end 94 of the retainer cap 46. The assembly of the index pin 44, retainer cap 46 and tension member 49 forms a shaft assembly 108 as shown in FIG. 3.

Referring now to FIG. 3, the shaft assembly 108 is inserted into the housing body 42 such that the first end 70 of the index pin 44 extends through the third passage 62 and the first end 102 of the tension member 49 seats against the shoulder 59 within the second segment 52 of the housing body 42. In this position, the second end 96 of the retainer cap 46 aligns with the end of the second segment 52 of the housing body 42. Also in this position, the groove 82 of the lock segment 74 of the index pin 44 aligns with the aperture 56 of the second segment 52 of the housing body 42. The shaft assembly 108 is retained in the installed position within the housing body 42 by the locking pin 57. As shown in FIG. 3, the locking pin 57 is inserted into the aperture 56 of the second segment 52 such as to mate with the groove 82 or flat 83. Mating of the locking pin 57 with the groove 82 or the flat 83 acts to lock the shaft assembly 108 within the housing body 42. In a next step, the sealing member 47 is installed over the first end 70 of the index pin 44 and positioned within the inner diameter D6 of the third passage 62. Finally, the retainer 64 is installed over the first end 70 of the index pin 44 and positioned within the inner diameter D6 of the third passage 62 such as to lock the sealing member 47 within the third passage 62. In the illustrated embodiment, the retainer 64 is a lock washer. However, in other embodiments, the retainer 64 can be other structures or devices, such as the non-limiting example of a lock ring. Assembly of the shaft assembly 108, sealing member 47 and retainer 64 within the housing body 42 forms a valve assembly 110 as shown in FIG. 1.

Referring again to FIG. 3, the locking pin 57 has a longitudinal axis C. The locking pin 57 is seated within the aperture 56 such that the axis C is substantially perpendicular to the index piston 44. In this position, the locking pin 57 is positioned to allow engagement with the groove 82 or the flat 83 of the index pin 44 as the index pin 44 rotates relative to the housing body 42. In the illustrated embodiment, the locking pin 57 is a roll pin having a circular cross-sectional shape. In other embodiments, the locking pin 57 can be other structures and can have other cross-sectional shapes.

The locking pin 57 has an outer diameter D15 that generally corresponds to the inner diameter D3 of the aperture 56. In the illustrated embodiment, the outer diameter D15 is approximately 0.126 inches. In other embodiments, the outer diameter D15 can be more or less than 0.126 inches, sufficient to generally correspond to the inner diameter D3 of the aperture 56.

In the illustrated embodiment, the locking pin 57 is formed from a corrosion-resistant material, such as the non-limiting examples of stainless steel. However, in other embodiments, the locking pin 57 can be formed from other corrosion-resistant materials, such as for example, titanium. The locking pin 57 can have any desired surface finish including the non-limiting examples of chrome or cadmium plating.

Referring again to FIG. 1, the key 88 includes a tubular portion 112 connected to a bow portion 114. The tubular portion 112 has a hollow internal cross-sectional shape that generally corresponds with the cross-sectional shape of the second end 80 of the index pin 44. Accordingly, the tubular portion 112 of the key 88 can mate with the second end 80 of the index pin 44. In the illustrated embodiment, the internal portion of the tubular portion 112 has a six-sided cross-sectional shape that approximates the hexagonal cross-sectional shape of the second end 80 of the index pin 44. In other embodiments, the internal portion of the tubular portion 112 can have other internal cross-sectional shapes that generally correspond to the second end 80 of the index pin 44. The bow portion 114 is configured to allow a user to apply torque to the tubular portion 112. Applying torque to the tubular portion 112 results in torque being applied to the index pin 44. Torque applied to the index pin 44 results in rotational movement of the index pin 44, thereby providing the locking and unlocking feature of the lockable assembly 40.

Figure 4:
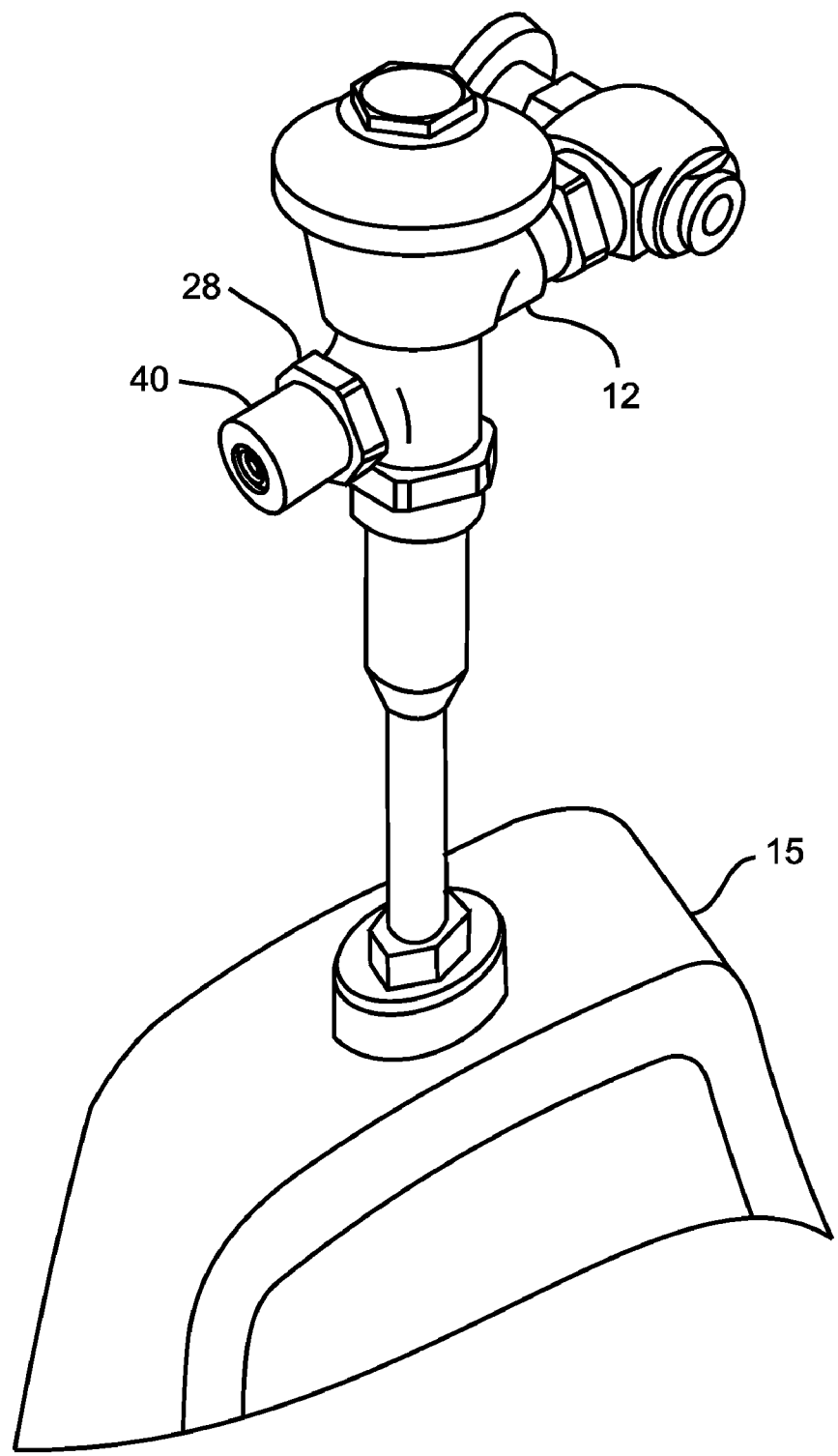
FIG. 4 is a perspective view of the lockable assembly of FIG. 1 illustrated in an installed position.

Referring again to FIG. 1 and as discussed above, the lockable assembly for a flush valve 40 is configured to replace the lever-operated assembly 14 for a conventional urinal flush valve, thereby allowing selective operation of the urinal flush valve between a manually-operated flushable state and a locked non-flushable state. The replacement of the lever-operated assembly 14 with the lockable assembly 40 is accomplished by first removing the lever-operated assembly 14 from the valve body 12. A replacement sealing member 30 and the lockable assembly 40 are inserted into the opening in the valve body 12 vacated by the lever-operated assembly 14, such that the first end 70 of the index pin 44 extends into the valve body 12 and can engage the flush valve (not shown). The lockable assembly 40 is further positioned against the valve body 12 such that the third segment 54 of the housing body 42 seats against a boss (not shown) within the valve body 12. The fastener 28 is used to secure the lockable assembly 40 in position against the valve body 12. The resulting lockable assembly 40, secured in position against the valve body 12, is shown in FIG. 4 in relation to a urinal 15.

In operation, a user determines the desired operational state of the lockable assembly 40. In a first state, the user locks the lockable assembly 40 by rotating the key 88 until the groove 82 in the lock segment 74 of the index pin 44 engages the locking pin 57. In a locked state, the index pin 44 cannot move in an axial direction, thereby preventing engagement with the flush valve within the interior of the valve body 12. Accordingly, in a locked state, the flush valve within the valve body 12 cannot be manually actuated.

In a second state, the user unlocks the lockable assembly 40 by rotating the key 88 until the locking pin 57 aligns with the flat 83 of the lock segment 74 of the index pin 44. In the unlocked state, the index pin 44 is free to move in an axial direction. Accordingly, depression of the retainer cap 46 urges the index pin 44 to move in an axial direction, and the first end 70 of the index pin 44 engages with the flush valve within the valve body 12. In an unlocked state, the flush valve within the valve body 12 can be manually actuated each time the retainer cap 46 is depressed. Depression of the retainer cap 46 results in a resistive tension applied by the tension member 49, which urges the index pin 44 back into a non-engaged position.

While the embodiment shown in FIGS. 1, 2 and 3 and discussed above provides for an axial alignment of the index pin 44 and the key 88, it should be appreciated that in other embodiments, the index pin 44 and a device for locking and unlocking the index pin 44 can be configured in non-axial arrangements.

While the embodiment illustrated in FIGS. 2, 3a and 3b and discussed above provides for replacement of the lever-operated assembly 14 within the valve body 12 with the lockable assembly 40, it should be appreciated that in other embodiments, the lockable assembly 40 can replace or be incorporated with or into other flush valve-related structures, devices and mechanisms, such as the non-limiting example of an automatic flush valve mechanism. One example of a conventional automatic flush valve mechanism is an automatic flush valve mechanism mounted to the side or upper portion of the valve body. The automatic flush mechanism is typically configured to provide automatic actuation of the flush valve triggered by different mechanisms or systems, including the non-limiting examples of infrared sensors, proximity sensors or timers.

Another example of a conventional automatic flush valve mechanism is an automatic flush valve mechanism mounted to a wall adjacent to the valve body. In this example, the flush valve mechanism can be hidden from view. The automatic actuation of the flush valve can be triggered by different mechanisms as discussed above.

Figure 5:
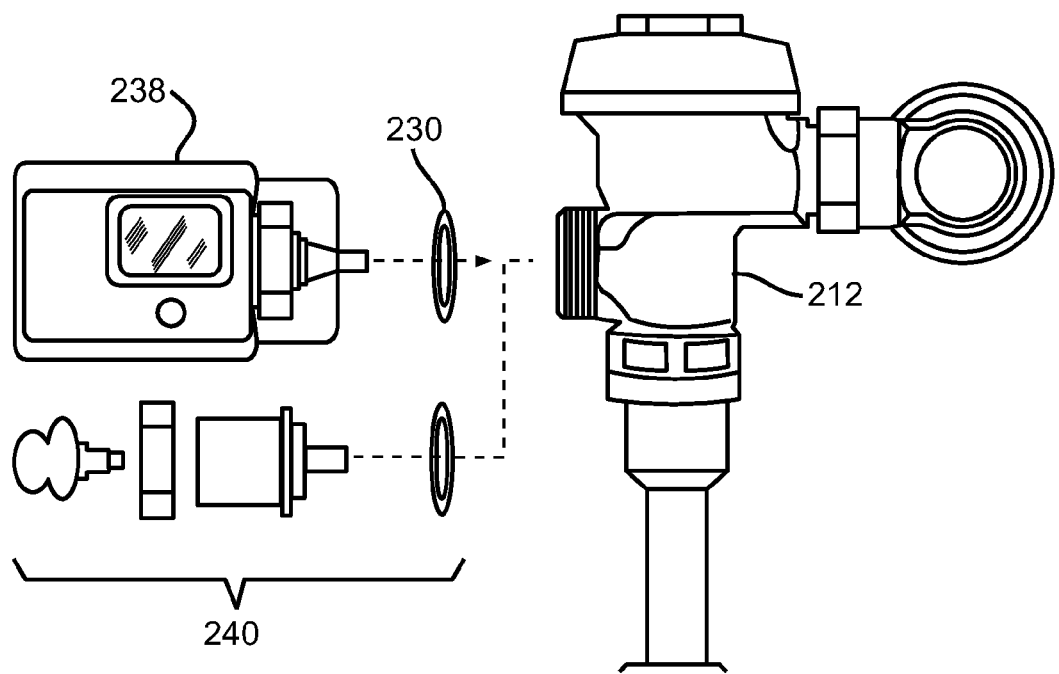
FIG. 5 is a side view, in elevation, of a lockable assembly configured to replace an automatic flush mechanism.

As discussed above, the lockable assembly can replace or be incorporated with or into other conventional automatic flush valve-related structures, devices and mechanisms. Accordingly, the function of allowing selective operation of the urinal flush valve between the automatic state and a locked non-flushable state can be incorporated into the various automatic flushing mechanisms. Referring first to the embodiment illustrated in FIG. 5, a valve body 212 having an automatic flush valve mechanism 238 and sealing member 230 is illustrated. In this embodiment, the automatic flush valve mechanism 238 and the sealing member 230 are removed and subsequently replaced with a lockable assembly 240, including a new sealing member 230. In the illustrated embodiment, the lockable assembly 240 and the sealing member 230 are the same as, or similar to, the lockable assembly 40 and the sealing member 30 illustrated in FIG. 1 and described above. In other embodiments, the lockable assembly 240 and the sealing member 230 can be different from the lockable assembly 40 and the sealing member 30. The lockable assembly 240 operates as discussed above for the lockable assembly 40.

Figure 6:
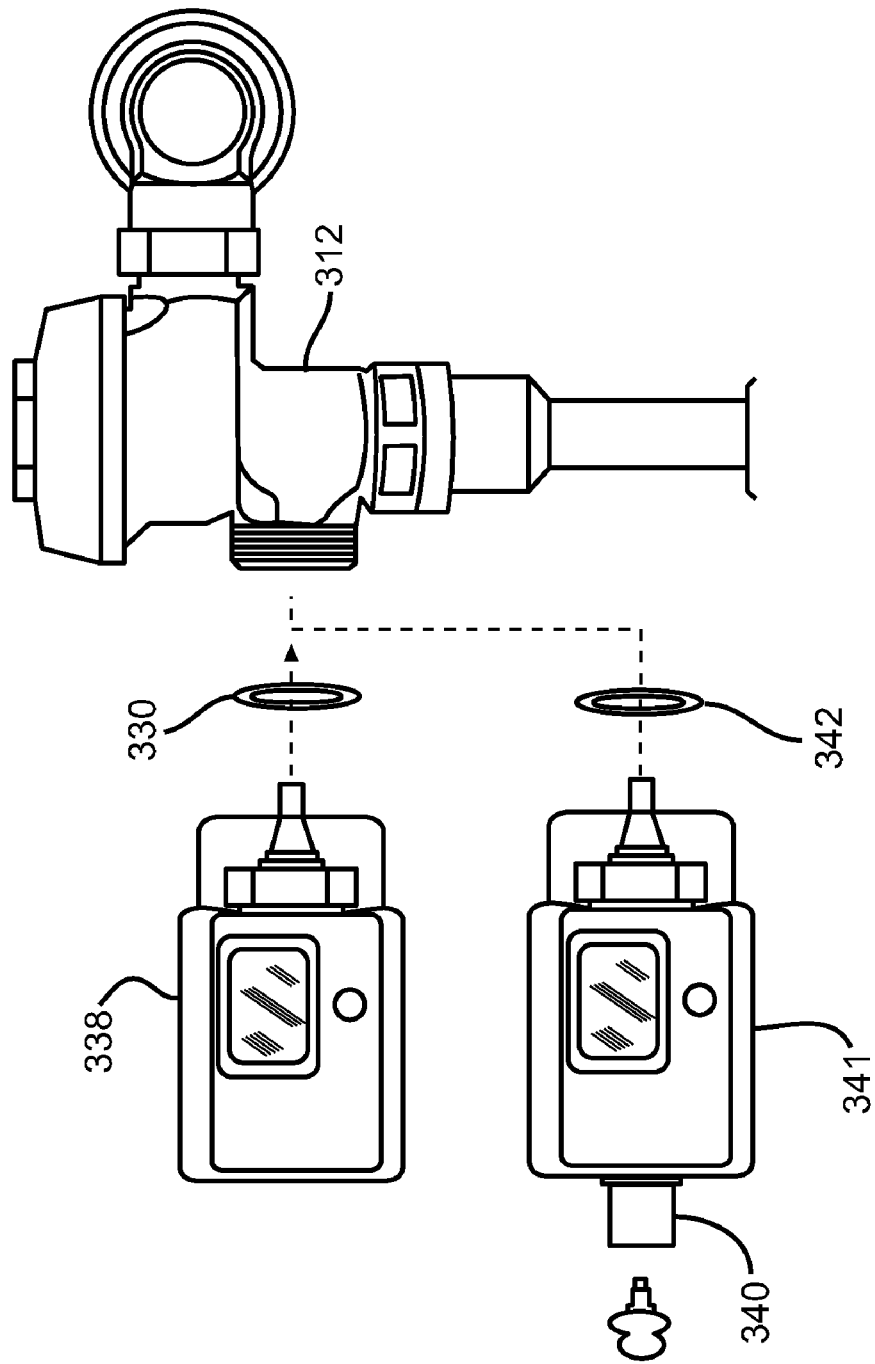
FIG. 6 is a side view, in elevation, of an automatic flush mechanism configured to include the lockable assembly of FIG. 1.

Referring now to FIG. 6, another embodiment of incorporating the lockable assembly into an automatic flush valve mechanism is illustrated. In this embodiment, an existing automatic flush valve mechanism 338 and sealing member 330 are removed from the valve body 312 and subsequently replaced with an automatic flush valve mechanism 341 and sealing member 342. The automatic flush valve mechanism 341 includes a lockable assembly 340 such as to provide selective operation of the urinal flush valve between the automatic state and a locked non-flushable state. In the illustrated embodiment, the lockable assembly 340 and the sealing member 342 are the same as, or similar to, the lockable assembly 40 and the sealing member 30 illustrated in FIG. 1 and described above. In other embodiments, the lockable assembly 340 and the sealing member 342 can be different from the lockable assembly 40 and the sealing member 30.

Figure 7:
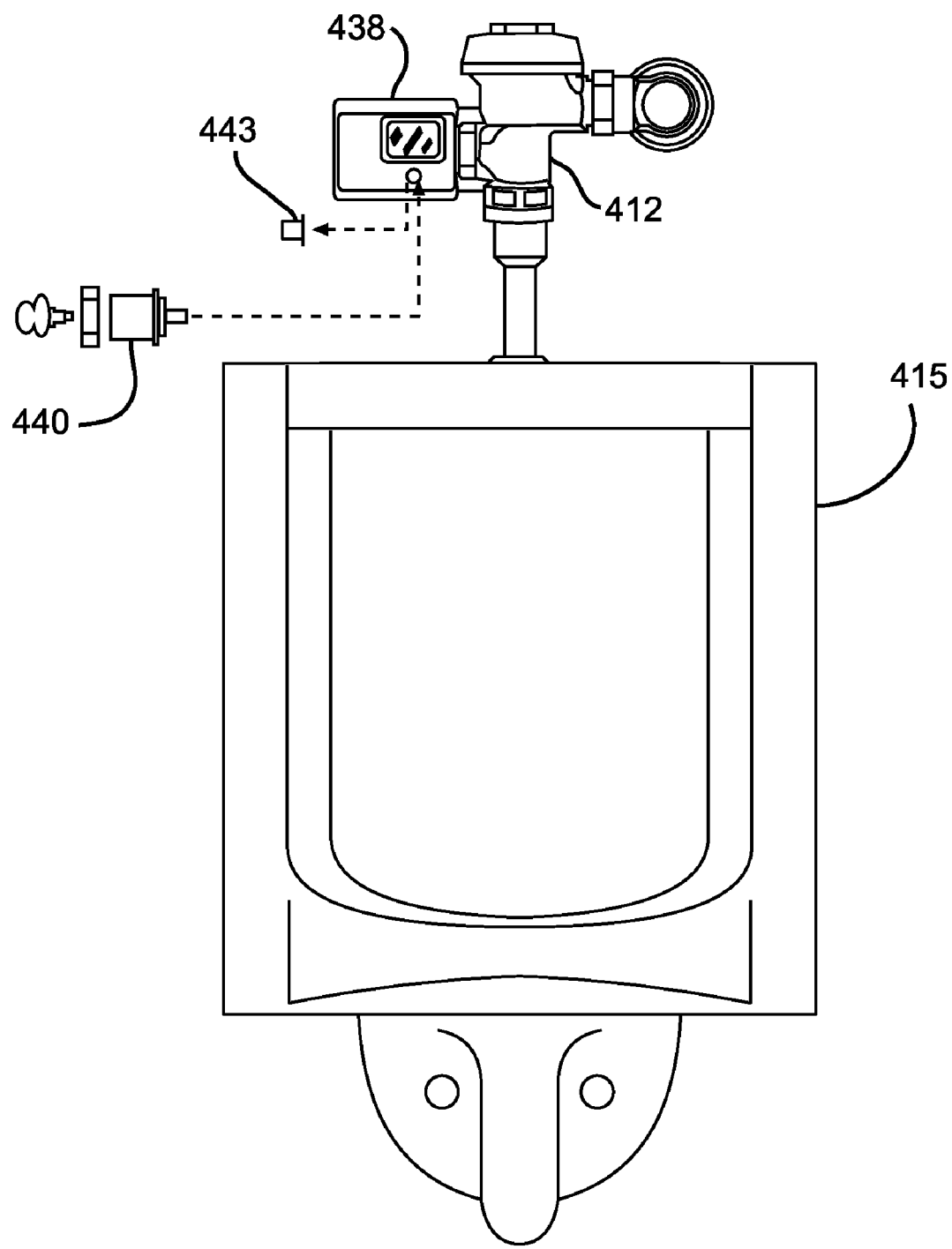
FIG. 7 is a front view, in elevation, of a lockable assembly configured to replace a manually-operated push button within an automatic flush mechanism.
Figure 8:
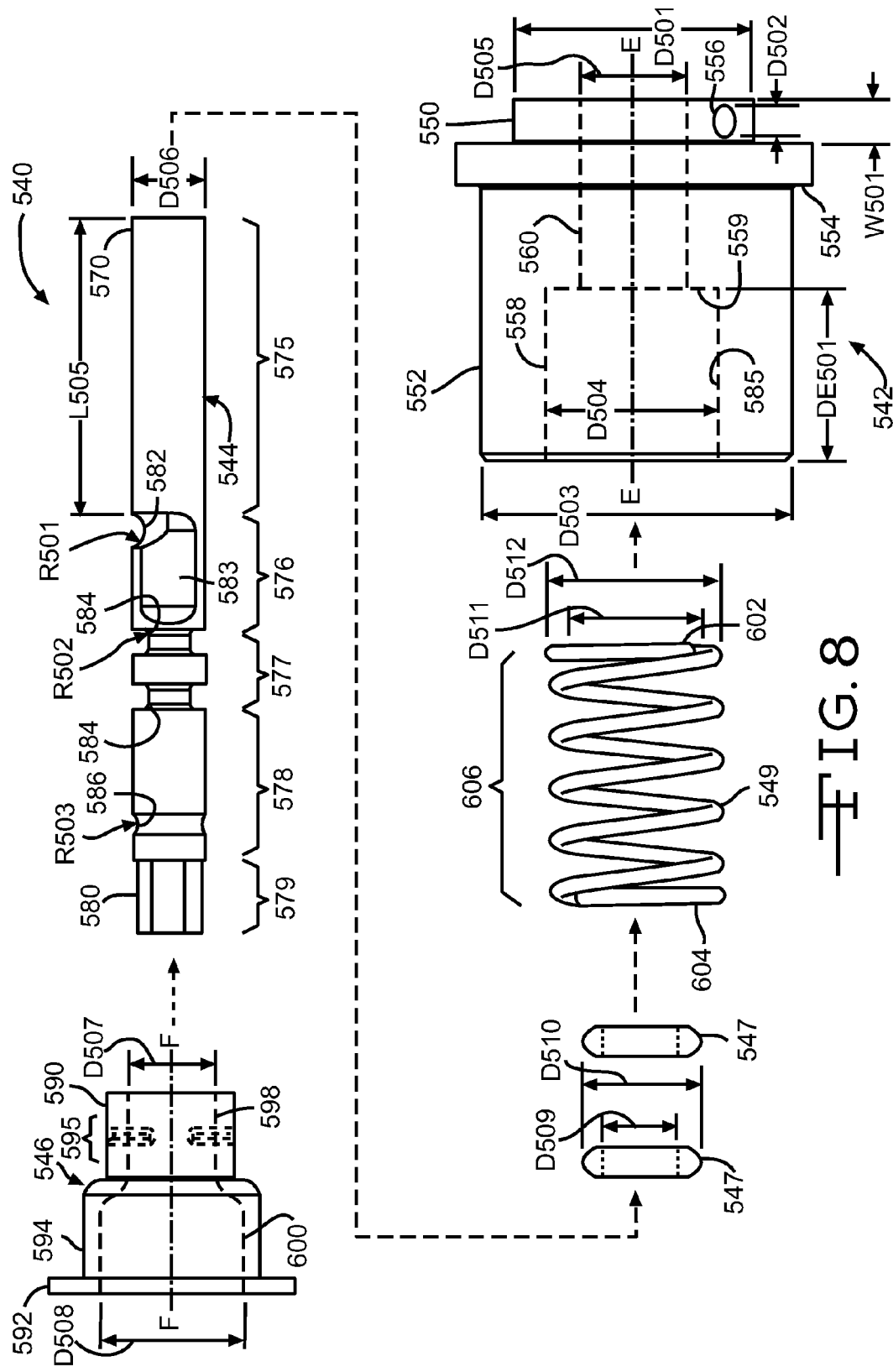
FIG. 8 is a side view, in elevation, of the components of another embodiment of a lockable assembly.

Referring now to FIG. 7, another embodiment of an incorporated lockable assembly into an automatic flush valve mechanism is illustrated. A urinal 415 with a valve body 412 having an automatic flush valve mechanism 438 is illustrated. The automatic flush valve mechanism 438 includes a manually-operated push button 443. The manually-operated push button 443 is configured to provide an alternate flush option that is independent of the automatic flush valve operation. In this embodiment, the manually-operated push button 443 is removed from the automatic flush valve mechanism 438 and subsequently replaced with a lockable assembly 440 such as to provide selective operation of the urinal flush valve between the automatic state and a locked non-flushable state. In the illustrated embodiment, the lockable assembly 440 is the same as, or similar to, the lockable assembly 40 illustrated in FIG. 1 and described above. In other embodiments, the lockable assembly 440 can be different from the lockable assembly 40. While the manually-operated push button 443 is shown in FIG. 8 as being positioned in the front of the automatic flush valve mechanism 438, it should be appreciated that manually-operated push button 443 can be positioned in other locations of the automatic flush valve mechanism 438, such as for example, the side or back of the automatic flush valve mechanism 438.

While the embodiment illustrated in FIG. 7 shows the replacement of the manually-operated push button 443 with the lockable assembly 440, it should be appreciated that in other embodiments, the manually-operated push button 443 can be replace with other structures, mechanisms and devices sufficient to provide selective operation of the urinal flush valve between the automatic state and a locked non-flushable state. One non-limiting example of an alternative structure is a lockable key switch (not shown). Upon actuation by an actuation key, the lockable key switch can be configured to provide selective operation of the urinal flush valve between the automatic state and a locked non-flushable state.

While the embodiment illustrated in FIG. 7 shows the removal of the manually-operated push button 443, it should be appreciated that in other embodiments, a lockable assembly 440 can be added to the automatic flush valve mechanism 338 such that the lockable assembly 440 provide an alternate flush option that is independent of the automatic flush valve operation. In this embodiment, a lockable assembly 440 is incorporated into the automatic flush valve mechanism 438 such as to disable the existing manually-operated push button and further to provide selective operation of the urinal flush valve between the automatic state and a locked non-flushable state. In the illustrated embodiment, the lockable assembly 440 is the same as, or similar to, the lockable assembly 40 illustrated in FIG. 1 and described above. In other embodiments, the lockable assembly 440 can be different from the lockable assembly 40.

While the lockable assembly has been described above as engaging a flush valve, it should be appreciated that in other embodiments, the lockable assembly can be configured to engage any valve, plumbing device or fitting, capable of supplying water to a urinal.

Figure 9:
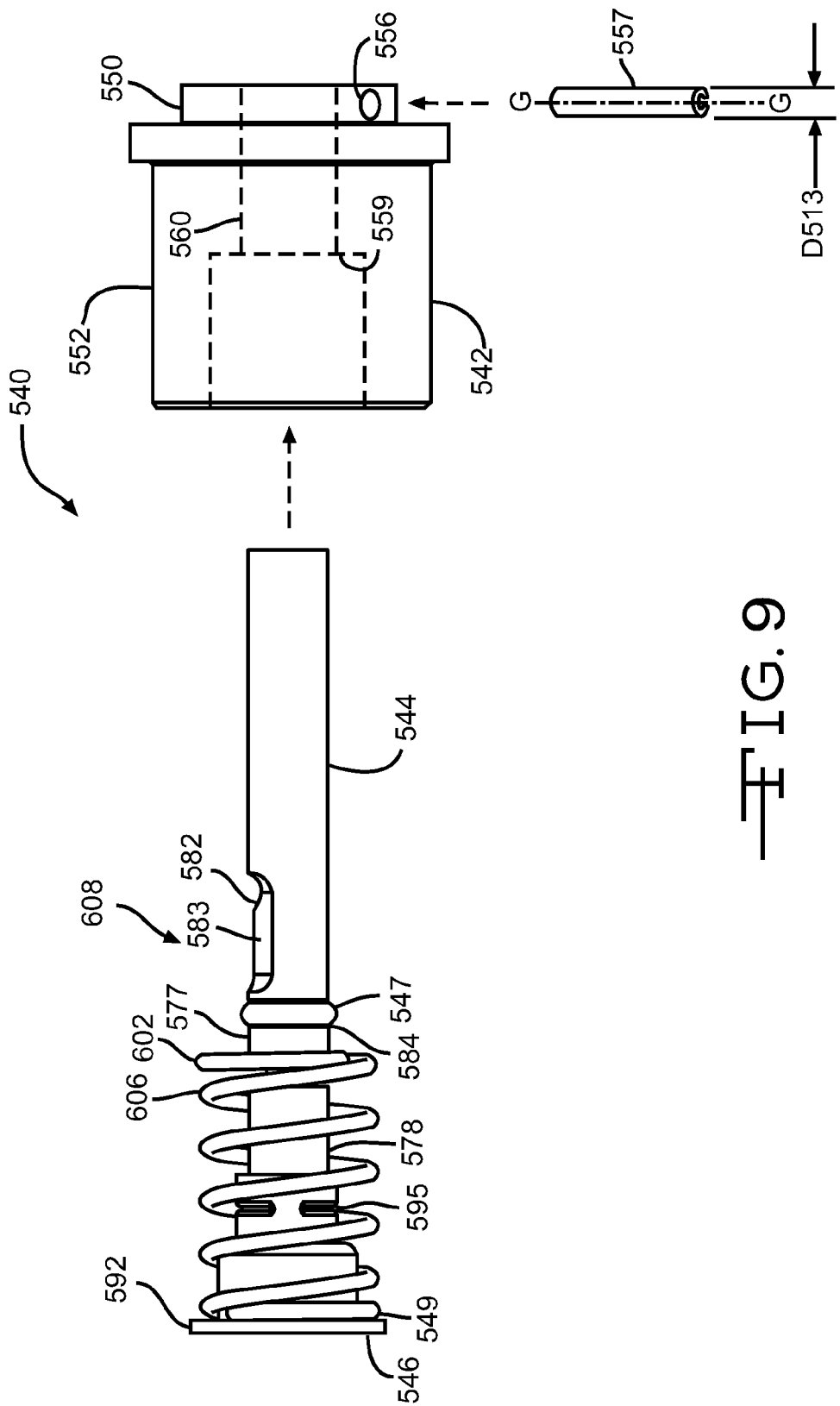
FIG. 9 is a side view, in elevation, of a shaft assembly and housing body forming the lockable assembly of FIG. 8.

Referring now to FIGS. 8 and 9, another embodiment of a lockable assembly is illustrated generally at 540. This embodiment of the lockable assembly 540 includes, among other things, sealing members positioned within a housing body, an aperture for a locking pin is positioned within a segment of the lockable assembly finally located in a valve body and a retainer cap including a crimp area configured for attachment to an index pin. The lockable assembly 540 includes a housing body 542, an index pin 544, a retainer cap 546, a plurality of sealing members 547 and a tension member 549.

Referring now to FIG. 8, portions of the housing body 542 are configured for insertion into a valve body and other portions of the housing body 542 are configured as an enclosure for various components of the lockable assembly 540. The housing body 542 includes a first segment 550, a second segment 552 and a third segment 554 extending therebetween. The first segment 550, second segment 552 and third segment 554 are concentric about a major axis E.

Referring again to FIG. 8, the first segment 550 of the housing body 542 is configured for insertion into a corresponding opening (not shown) of a valve body. In the illustrated embodiment, the first segment 550 has a circular cross-sectional shape and has an outer diameter D501 of about 1.0 inches. In other embodiments, the first segment 550 can have other cross-sectional shapes and can have an outer diameter D501 of more or less than about 1.0 inches.

The first segment 550 has a width W501 sufficient to include an aperture 556. In the embodiment illustrated in FIG. 8, the width W501 is about 0.185 inches. In other embodiments, the first segment 550 can have a width W501 of more or less than about 0.185 inches, sufficient to include the aperture 556.

The aperture 556 has an inner diameter D502 sufficient for retention of a locking pin 557 as shown in FIG. 9. Referring again to embodiment illustrated in FIG. 2, the aperture 556 has a circular cross-sectional shape and the inner diameter D502 is about 0.126 inches. In other embodiments, the aperture 556 can have other cross-sectional shapes and the inner diameter D502 can be more or less than about 0.126 inches sufficient for retention of a locking pin 557. The aperture 556 will be discussed in more detail below.

Referring again to FIG. 8, the second segment 552 of the housing body 542 is configured as an enclosure for various components of the lockable assembly 540. The second segment 552 includes a first internal passage 558, which will be discussed in more detail below. In the illustrated embodiment, the second segment 552 has a circular cross-sectional shape and has an outer diameter D503 of about 1.30 inches. In other embodiments, the second segment 552 can have other cross-sectional shapes and the outer diameter D503 can be more or less than about 1.30 inches sufficient to include the first internal passage 558.

The third segment 554 of the housing body 542 extends in a radial direction from the housing body 542 and is configured as a flange for placement against a mating surface (not shown) of a valve body. The third segment 554 acts to limit the insertion depth of the first segment 550 of the housing body 542. In the illustrated embodiment, the third segment 554 has a circular cross-sectional shape. In other embodiments, the third segment 554 can have other cross-sectional shapes and can have any desired diameter sufficient to form a flange for placement against a mating surface (not shown) of a valve body.

Referring again to FIG. 8, the first internal passage 558, concentric with the major axis E, extends into the second segment 552 a depth DE501 such as to form a shoulder 559 within the second segment 552. The shoulder 559 will be discussed in more detail below. The first internal passage 558 has an inner diameter D504 sufficient to house the tension member 549. In the illustrated embodiment, the first internal passage 558 has a circular cross-sectional shape, a depth DE501 of about 0.77 inches and an inner diameter D504 of about 0.625 inches. In other embodiments, the first internal passage 558 can have other cross-sectional shapes, a depth DE501 of more or less than about 0.77 inches and an inner diameter D504 of more or less than about 0.625 inches.

A second internal passage 560, concentric with the major axis E, extends within the housing body 542 from the shoulder 559 formed by the first internal passage 558 through the first segment 550. The second internal passage 560 has an inner diameter D505 sufficient to allow insertion of the index pin 544 through the first, second and third segments, 550, 552 and 554, of the housing body 542 and further sufficient to allow axial movement of the index pin 544 relative to the housing body 542. In the illustrated embodiment, the second internal passage 560 has a circular cross-sectional shape and has an inner diameter D505 of about 0.252 inches. In other embodiments, the second internal passage 560 can have other cross-sectional shapes and the inner diameter D505 can be more or less than about 0.252 inches sufficient to allow insertion of the index pin 544 through the first, second and third segments, 550, 552 and 554, of the housing body 542 and further sufficient to allow axial movement of the index pin 544 relative to the housing body 542. The first and second internal passages, 558 and 560, will be discussed in more detail below.

In the embodiment illustrated in FIG. 8, the housing body 542 is made from corrosion-resistant materials, such as the non-limiting examples of stainless steel or brass. However, in other embodiments, the housing body 542 can be made from other corrosion-resistant materials, such as for example, polyethylene. While the embodiment illustrated in FIG. 8 shows the housing body 542 as a one-piece structure, it should be appreciated that in other embodiments, the housing body 542 can be assembled from discrete components. The housing body 542 can have any desired surface finish including the non-limiting examples of chrome or cadmium plating.

Referring again to FIG. 8, the index pin 544 is configured for rotation relative to the housing body 542 and further configured for movement in an axial direction relative to the housing body 542. Rotational movement of the index pin 544 alternatively locks or unlocks the axial movement of the index pin 544 relative to the housing body 542. Axial movement of the index pin 544 in the direction toward a valve body results in actuation of a valve (not shown) positioned within the interior of the valve body. The index pin 544 has a nominal outer diameter D506. In the illustrated embodiment, the nominal outer diameter D506 is about 0.25 inches. In other embodiments, the nominal outer diameter D506 can be more or less than about 0.25 inches.

The index pin 544 includes a first end 570, an extension segment 575, a lock segment 576, a seal segment 577, a crimp segment 578 and a key segment 579.

Referring again to FIG. 8, the first end 570 of the extension segment 575 has a shape of a substantially flat surface. The flat surface of the first end 570 is configured to engage portions of the flush valve within the interior of a valve body. In other embodiments, the first end 570 of the index pin 544 can have other shapes, such as the non-limiting example of an arcuate shape, sufficient to engage portions of the flush valve within the interior of the valve body.

The extension segment 575 of the index pin 544 extends from the lock segment 576 to the first end 570 a length L505 sufficient to allow the first end 570 of the index pin 544 to engage portions of the flush valve within the interior of a valve body. In the illustrated embodiment, the length L505 is in a range of from about 0.80 inches to about 1.20 inches. In other embodiments, the length L505 can be less than about 0.80 inches or more than about 1.20 inches. In still other embodiments, such as for example when the valve body or portions of the valve body are concealed behind walls, the extension segment 575 can have a length L505 of about 10.0 inches to 16.0 inches or more.

Referring again to FIG. 8, the lock segment 576 extends from the extension segment 575 to the seal segment 577. The lock segment 576 includes a groove 582 adjacent a flat 583. As shown in FIG. 8, the groove 582 and a portion of the flat 583 are within the same vertical plane and the groove 582 is orientated at a generally perpendicular angle with the flat 583. Accordingly, when the index pin 544 is in an installed position within the housing body 542, the vertical plane containing the groove 582 and a portion of the flat 583 aligns with the locking pin 557. In this position, rotation of the index pin 544 is used to selectively engage or disengage the locking pin 557 with the groove 582 or the flat 583. In one example, rotation of the index pin 544 engages the groove 582 with the locking pin 557 such as to prevent movement of the index pin 544 in an axial direction. In another example, rotation of the index pin 544 disengages the groove 582 with the locking pin 557 such that the locking pin 557 now aligns with the portion of the flat 583. In this position, the index pin 544 is capable of movement in an axial direction.

Referring again to FIG. 8, the groove 582 has a radius R501 sufficient to allow engagement with the locking pin 557. In the illustrated embodiment, the radius R501 is about 0.063 inches. Alternatively, the radius R501 can be more or less than about 0.063 inches provided the radius R501 is sufficient to allow engagement with the locking pin 557.

While the embodiment illustrated in FIG. 8 shows the groove 582 as having an arcuate cross-sectional shape, it should be appreciated that in other embodiments, the groove 582 can have other cross-sectional shapes, such as the non-limiting examples of a square or rectangular cross-sectional shape, sufficient to engage the locking pin 557.

The seal segment 577 extends from the lock segment 576 to the crimp segment 578. The seal segment 577 includes a plurality of first circumferential grooves 584. The first circumferential grooves 584 are configured to retain sealing members 547. The seal segment 577 is configured such that in an installed position within the housing body 542, the sealing members 547 are configured to seal against a circumferential wall 585 formed by the first internal passage 558.

Referring again to FIG. 8, the first circumferential grooves 584 have a radius R502 sufficient to allow retention of the seal members 547. In the illustrated embodiment, the radius R502 is about 0.142 inches. Alternatively, the radius R502 can be more or less than about 0.142 inches sufficient to allow retention of the seal members 547.

The embodiment of the seal segment 577 illustrated in FIG. 8 shows a quantity of two first circumferential grooves 584 corresponding to the use of two seal members 547. Without being held to the theory, it is believed that a quantity of two seal members 547 provides the index pin 544 with guidance and stability in radial directions as the index pin 544 in moved in axial directions. However, it should be appreciated that in other embodiments, one first circumferential groove 584 or more than two first circumferential grooves 584 can be used.

While the embodiment of the seal segment 577 illustrates first circumferential grooves 584 that have the same radius R502, it should be appreciated that in other embodiments, the first circumferential grooves 584 can have different radii, corresponding to the use of different types of sealing members 547.

The crimp segment 578 of the index pin 544 extends from the seal segment 577 to the key segment 579. The crimp segment 578 includes a second circumferential groove 586. As will be discussed in more detail below, the second circumferential groove 586 is configured to receive crimped material formed from a portion of the retainer cap 546. The second circumferential groove 586 has a radius R503. In the illustrated embodiment, the radius R503 is about 0.11 inches. Alternatively, the radius R503 can be more or less than about 0.11 inches, sufficient to receive crimped material formed from a portion of the retainer cap 546. While the embodiment of the crimp segment 578 shown in FIG. 8 illustrates a single second circumferential groove 586, in other embodiments more than one second circumferential groove 586 an be used.

The key segment 579 extends from the crimp segment 578 to the second end 580. The key segment 579 is configured with a shape that cooperates with a shape of a portion of the key 88, as shown in FIG. 1, such that rotation of the key 88 forces rotation of the index pin 544. In the illustrated embodiment, the key segment 579 is formed to have a hexagonal cross-sectional shape, corresponding to a hexagonal shape of a portion of the key 588. However, in other embodiments, the key segment 579 can have other cross-sectional shapes, such as for example, square, rectangular, triangular or star cross-sectional shapes.

In the embodiment illustrated in FIG. 8, the index pin 544 is made from corrosion-resistant materials, such as the non-limiting example of stainless steel. However, in other embodiments, the index pin 544 can be made from other corrosion-resistant materials, such as for example, brass or polyethylene. The index piston 544 can have any desired surface finish including the non-limiting examples of chrome or cadmium plating.

The retainer cap 546 includes a first segment 590, a second segment 592 and a third segment 594 extending therebetween. The first segment 590, second segment 594 and third segment 592 are concentric about a major axis F.

Referring again to FIG. 8, the first segment 590 of the retainer cap 546 has a crimp area 595 and a first internal passage 598. The crimp area 595 is configured such that a portion of the crimp area 595 can be compressed into the second circumferential groove 586 of the crimp segment 578 of the index pin 544. The crimp area 595 can have any desired width sufficient to allow a portion of the crimp area 595 to be compressed.

The first internal passage 598 has an inner diameter D507 generally corresponding the outer diameter D506 of the index pin 544. In the illustrated embodiment, the first segment 590 has a circular cross-sectional shape and the first internal passage 598 has an inner diameter D507 of about 0.252 inches. In other embodiments, the first segment 590 can have other cross-sectional shapes and the diameter D507 of the first passage 598 can be more or less than about 0.252 inches, sufficient to generally correspond to the outer diameter D506 of the index pin 544.

Referring again to FIG. 8, an interior portion of the second segment 592 of the retainer cap 46 is configured to provide a circumferential clearance between the hexagonal-shaped second end 580 of the index pin 544 and an interior surface of the second segment 592. The second segment 592 includes a second internal passage 600, which will be discussed in more detail below. In the illustrated embodiment, the second segment 592 has a circular cross-sectional shape and the second internal passage 600 has an inner diameter D508 of about 0.375 inches. In other embodiments, the second segment 592 can have other cross-sectional shapes and the diameter D508 of the second internal passage 600 can be more or less than about 0.375 inches sufficient to provide a circumferential clearance between the hexagonal-shaped second end 580 of the index pin 544 and an interior surface of the second segment 592.

The third segment 594 of the retainer cap 546 connects the first segment 590 with the second segment 592 and is configured to provide a circumferential clearance between the hexagonal-shaped second end 580 of the index pin 544 and an interior surface of the third segment 594. In the illustrated embodiment, the third segment 594 has a circular cross-sectional shape. In other embodiments, the third segment 594 can have other cross-sectional shapes.

Referring again to FIG. 8, the second internal passage 600, concentric with the major axis F, extends through the second segment 592 and through the third segment 594 and connects to the first internal passage 598. In the illustrated embodiment, the first internal passage 598 and the second internal passage 600 have a circular cross-sectional shape. In other embodiments, the first internal passage 598 and the second internal passage 600 can have other cross-sectional shapes.

In the embodiment illustrated in FIG. 8, the retainer cap 546 is made from corrosion-resistant materials, such as the non-limiting examples of stainless steel or brass. However, in other embodiments, the retainer cap 546 can be made from other corrosion-resistant materials, such as for example, polyethylene. While the embodiment illustrated in FIG. 8 shows the retainer cap 546 as a one-piece structure, it should be appreciated that in other embodiments, the retainer cap 546 can be assembled from discrete components. The retainer cap 546 can have any desired surface finish including the non-limiting examples of chrome or cadmium plating.

Referring again to FIG. 8, the sealing members 547 are configured to seat in the first circumferential grooves 584 of the seal segment 577 and further configured to seal against the circumferential surface of the second internal passage 560 in the first segment 550 of the housing body 542. Each sealing member 547 has an inner diameter D509 that generally corresponds to the radius R502 of the first circumferential grooves 584 and an outer diameter D510 that generally corresponds to the inner diameter D505 of the second internal passage 560. In the illustrated embodiment, the inner diameter D509 is about 0.145 inches and the outer diameter D510 is about 0.285 inches. In other embodiments, the sealing members 547 can have an inner diameter D509 more or less than about 0.145 inches sufficient to correspond to the radius R502 of the first circumferential grooves 584, and an outer diameter D510 more or less than about 0.285 inches, sufficient to correspond to the inner diameter D505 of the second internal passage 560.

In the embodiment illustrated in FIG. 8, the sealing members 547 are configured to seal water having pressures in a range of from about 40 pounds per square inch (psi) to about 180 psi. In other embodiments, the sealing members 547 can be configured to seal water pressures less than about 40 psi or more than about 180 psi. In the illustrated embodiment, the sealing members 547 are formed from a polymeric material, such as the non-limiting example of neoprene. Alternatively, in other embodiments the sealing members 547 can be formed from other desired materials, such as for example silicone-based materials.

Referring again to FIG. 8, the tension member 549 has a first end 602, a second end 604 and an intermediate portion 606. As will be discussed in more detail below the first end 602 of the tension member 549 has a substantially flat surface configured to seat against the shoulder 559 within the second segment 552 of the housing body 542. Similarly, the second end 604 of the tension member 549 has a substantially flat surface configured to seat against the second segment 592 of the retainer cap 546. The intermediate portion 606 of the tension member 549 is configured for compression and expansion as will be discussed in more detail below.

The tension member 549 has an inner diameter D511 that generally corresponds to the outer diameter D506 of the index pin 544 and an outer diameter D512 that generally corresponds to the inner diameter D504 of the first passage 558. In the illustrated embodiment, the inner diameter D511 is about 0.510 inches and the outer diameter D512 is about 0.60 inches. In other embodiments, the inner diameter D511 can be more or less than about 0.510 inches, sufficient to correspond to the outer diameter D506 of the index pin 544, and the outer diameter D512 can be more or less than about 0.60 inches, sufficient to correspond to the inner diameter D504 of the first passage 558.

While the embodiment of the tension member 549 shown in FIG. 8 shows a helical spring, it should be appreciated that in other embodiments the tension member 549 can be other structures, mechanisms or devices, such as for example leaf springs, pneumatic springs or elastomeric fluids.

Referring now to FIGS. 8 and 9, assembly of the lockable assembly 540 will now be described. In a first step, the key segment 579 of the index pin 544 is inserted through the first and second internal passages, 598 and 600, of the retainer cap 546 such that the crimp area 595 of the retainer cap 546 aligns with the groove 586 of the crimp segment 578 of the index pin 44. Next, the crimp area 595 is crimped such as to compress material forming the crimp area 595 into the groove 586 of the crimp segment 578. The crimp area 595 is compressed sufficiently to permanently connect the retainer cap 546 to the index pin 544. In a next step, the first end 570 of the index pin 544 is passed through the sealing members 547 such that the sealing members 547 seat in the grooves 584 of the seal segment 577. Once the sealing members 547 are seated in the grooves 584, the first end 570 of the index pin 544 is slid through the tension member 549 such that the second end 604 of the tension member 549 seats against the second segment 592 of the retainer cap 546. The assembly of the index pin 544, retainer cap 546, sealing members 547 and tension member 549 forms a shaft assembly 608 as shown in FIG. 9.

Referring now to FIG. 9, the shaft assembly 608 is inserted into the housing body 542 such that the sealing members 547 contact the inner surface of the second passage 560, the first end 602 of the tension member 549 seats against the shoulder 559 within the second segment 552 of the housing body 542 and the second segment 592 of the retainer cap 546 aligns with the end of the second segment 552 of the housing body 542. In this position, the groove 582 of the lock segment 576 of the index pin 544 aligns with the aperture 556 of the first segment 550 of the housing body 542. The shaft assembly 608 is retained in this installed position within the housing body 542 by the locking pin 557. As shown in FIG. 9, the locking pin 557 is inserted into the aperture 556 of the first segment 550 such as to mate with the groove 582 or flat 583. Mating of the locking pin 557 with the groove 582 or the flat 583 acts to lock the shaft assembly 608 within the housing body 542. Assembly of the shaft assembly 608 within the housing body 542 forms a valve assembly 110 as shown in FIG. 1.

Referring again to FIG. 9, the locking pin 557 has a longitudinal axis G. The locking pin 557 is seated within the aperture 556 such that the longitudinal axis G is substantially perpendicular to the index pin 544. In this position, the locking pin 557 is positioned to allow engagement with the groove 582 or the flat 583 of the index pin 544 as the index pin 544 rotates relative to the housing body 542. In the illustrated embodiment, the locking pin 557 is a roll pin having a circular cross-sectional shape. In other embodiments, the locking pin 557 can be other structures and can have other cross-sectional shapes.

The locking pin 557 has an outer diameter D513 that generally corresponds to the inner diameter D502 of the aperture 556. In the illustrated embodiment, the outer diameter D513 is approximately 0.126 inches. In other embodiments, the outer diameter D513 can be more or less than 0.126 inches, sufficient to generally correspond to the inner diameter D502 of the aperture 556.

In the illustrated embodiment, the locking pin 557 is formed from a corrosion-resistant material, such as the non-limiting examples of stainless steel. However, in other embodiments, the locking pin 557 can be formed from other corrosion-resistant materials, such as for example, titanium. The locking pin 557 can have any desired surface finish including the non-limiting examples of chrome or cadmium plating.

Referring again to FIG. 1 and as discussed above, the key 88 includes a tubular portion 112 connected to a bow portion 114. The tubular portion 112 has a hollow internal cross-sectional shape that generally corresponds with the cross-sectional shape of the second end 580 of the index pin 544 as shown in FIG. 8. Accordingly, the tubular portion 112 of the key 88 can mate with the second end 580 of the index pin 544. In the illustrated embodiment, the internal portion of the tubular portion 112 has a six-sided cross-sectional shape that approximates the hexagonal cross-sectional shape of the second end 580 of the index pin 544. In other embodiments, the internal portion of the tubular portion 112 can have other internal cross-sectional shapes that generally correspond to the second end 580 of the index pin 544. As further discussed above, applying torque to the tubular portion 112 results in torque being applied to the index pin 544. Torque applied to the index pin 544 results in rotational movement of the index pin 544, thereby providing the locking and unlocking feature of the lockable assembly 540.

Referring again to FIG. 1 and as discussed above, the lockable assembly for a flush valve 540 is configured to replace the lever-operated assembly 14 for a conventional urinal flush valve, thereby allowing selective operation of the urinal flush valve between a manually-operable flush state and a locked non-flushable state. The replacement of the lever-operated assembly 14 with the lockable assembly 540 is accomplished in the same manner as discussed above for the lockable assembly 40. A user operates the lockable assembly 540 in the same manner as discussed above.

While the embodiment shown in FIGS. 8 and 9 and discussed above provides for an axial alignment of the index pin 544 and the key 88, it should be appreciated that in other embodiments, the index pin 544 and a device for locking and unlocking the index pin 544 can be configured in non-axial arrangements.

Figure 10:
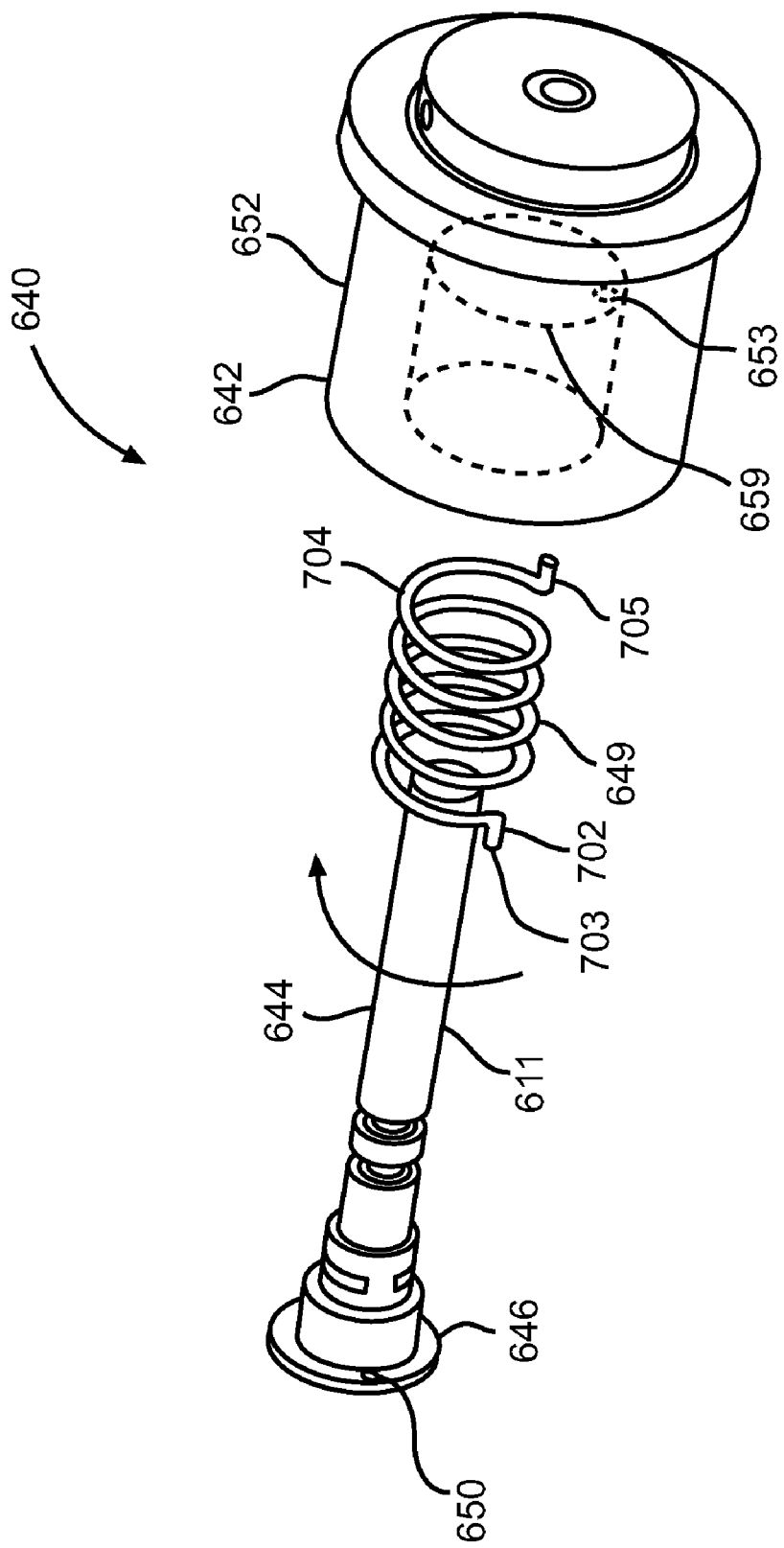
FIG. 10 is a perspective view of another embodiment of a lockable assembly.

Referring now to FIG. 10, another embodiment of a lockable assembly is shown at 640. Generally, the lockable assembly 640 includes a tension member configured to automatically return a shaft assembly to a locked position after use. The lockable assembly 640 includes a housing body 642 and a shaft assembly 611. The shaft assembly 611 includes an index pin 644, retainer cap 646 and tension member 649. The retainer cap 646 includes a first indexing aperture 650 and the housing body 642 including a second indexing aperture 653 extending from a shoulder 659 of the second segment 652 of the housing body 642. The tension member 649 includes a first end 702 having a first tab 703 and a second end 704 having a second tab 705. During assembly of the shaft assembly 611 and the housing body 642, the first tab 703 is positioned within the first indexing aperture 650 and the second tab 705 is positioned within the second indexing aperture 653.

Referring again to FIG. 10, in operation, a user determines the desired operational state of the lockable assembly 640. In a first state, the user locks the lockable assembly 640 as described above. In the locked state, the index pin 644 cannot move in an axial direction. In the second state, the user unlocks the lockable assembly 640 and depresses the retainer cap 646 to initiate a flush as also described above. The action of depressing the retainer cap 646 acts to axially and rotationally compress the tension member 649. Releasing the retainer cap 646 allows the tension member 649 to axially and rotationally expand back to an initial position, thereby automatically returning the index pin 644 to a position where the groove in the lock segment of the index pin 644 aligns with the locking pin (not shown), thereby preventing axial movement of the index pin 644. In this manner, the lockable assembly advantageously and automatically prevents a user from forgetting to lock the lockable assembly 640.

As discussed above and as shown in FIGS. 1-10, the lockable assemblies 40, 240, 340, 440, 540 and 640 are configured such that movement in an axial direction by an index pin against a valve stem causes displacement of the valve stem and subsequent displacement of the valve head from a valve seat, thereby allowing a rush of water through the valve body and into the urinal. However, it is within the contemplation of this invention that a lockable assembly can employ other forces, including non-axial forces, against a valve stem in order to displace the valve stem and subsequently displace the valve head from a valve seat. The term "other forces, including non-axial forces", as used herein, is defined to mean any act or process applied against a valve stem that causes displacement of the valve stem and subsequent displacement of a valve head from a valve seat. Non-limiting examples of other forces include rotational forces, lifting forces, and pushing or pulling forces. As will be explained below and shown in FIGS. 11 through 17, the other forces can be derived from any desired variety of mechanisms and devices.

Figure 11:
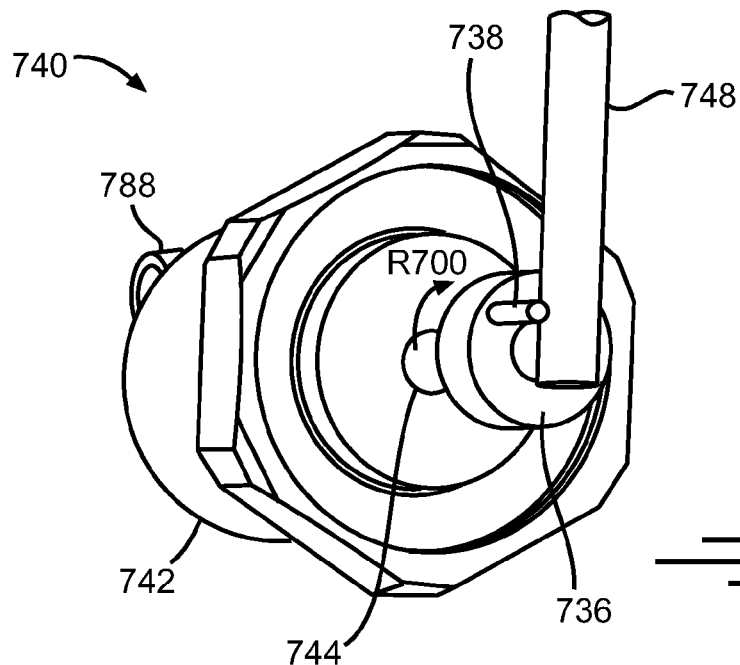
FIG. 11 is a perspective view of another embodiment of a lockable assembly.

Referring now to FIG. 11, another embodiment of a lockable assembly is shown generally at 740. The lockable assembly 740 includes an index pin 744 extending from a housing body 742. In the illustrated embodiment, the housing body 742 and the index pin 744 are the same as, or similar to, the housing body 542 and index pin 544 discussed above and shown in FIG. 9. However, in other embodiments, the housing body 742 and the index pin 744 can be different from the housing body 542 and index pin 544.

Referring again to FIG. 11, a disc 736 is attached to the index pin 744 such that clockwise rotation of the index pin 744 causes clockwise rotation of the disc 736 as shown by direction arrow R700. In the illustrated embodiment, the disc 736 has a circular cross-sectional shape. However, it should be appreciated that the disc 736 can have other desired shapes. An engagement pin 738 is attached to and extends from the disc 736. The engagement pin 738 is positioned on the disc 736 such as to contact a valve stem 748 as the disc 736 rotates.

In operation, rotation of the index pin 744, as caused by a key 788, causes rotation of the disc 736. Rotation of the disc 736 urges the engagement pin 738 into contact with the valve stem 748. Continued rotation of the disc 736 causes the engagement pin 738 to exert a force against the valve stem, thereby resulting in displacement of the valve stem 748. In this manner, rotational forces are employed against a valve stem in order to displace the valve stem and subsequently displace the valve head from a valve seat. While the embodiment of the lockable assembly 740 illustrated in FIG. 11 shows a clockwise rotation of the disc 736, it should be appreciated that in other embodiments, the disc 736 can be rotated in a counter-clockwise direction.

Figure 12:
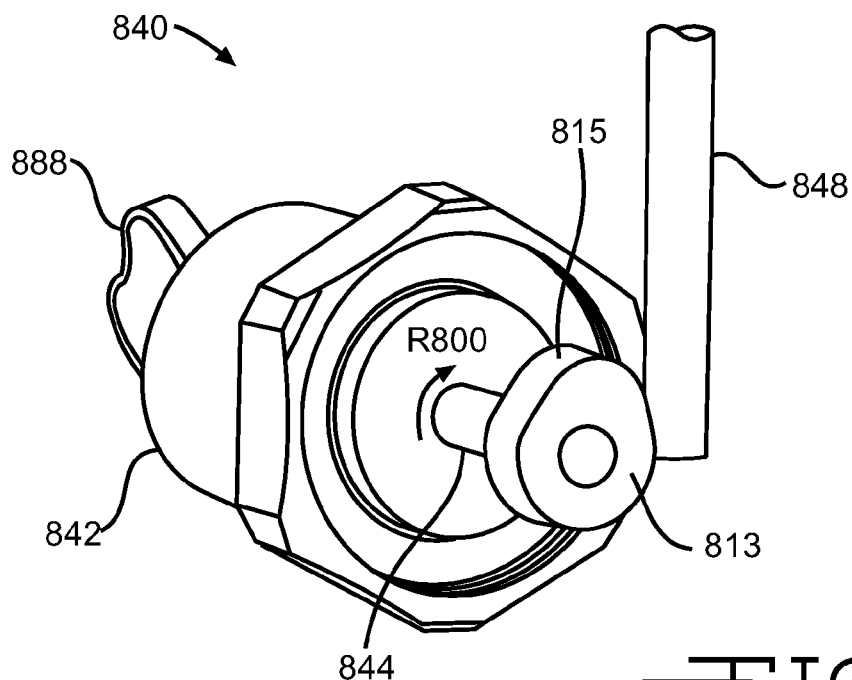
FIG. 12 is a perspective view of another embodiment of a lockable assembly.

Referring now to FIG. 12, another embodiment of a lockable assembly is shown generally at 840. The lockable assembly 840 includes an index pin 844 extending from a housing body 842. In the illustrated embodiment, the housing body 842 and the index pin 844 are the same as, or similar to, the housing body 542 and index pin 544 discussed above and shown in FIG. 9. However, in other embodiments, the housing body 842 and the index pin 844 can be different from the housing body 542 and index pin 544.

Referring again to FIG. 12, a cam 813 is attached to the index pin 844. The cam 813 and the index pin 844 are configured such that clockwise rotation of the index pin 844 causes clockwise rotation of the cam 813 as shown by direction arrow R800. In the illustrated embodiment, the cam 813 has a generally circular cross-sectional shape. However, it should be appreciated that the cam 813 can have other desired cross-sectional shapes. The cam 813 includes a cam lobe 815. The term "lobe", as used herein, is defined to mean a projection extending from the cam 813. The cam lobe 815 is positioned on the cam 813 such as to contact a valve stem 848 as the cam 813 rotates.

In operation, rotation of the index pin 844, as caused by a key 888, causes rotation of the cam 813. Rotation of the cam 813 urges the cam lobe 815 into contact with the valve stem 848. Continued rotation of the cam 813 causes the cam lobe 815 to exert a force against the valve stem thereby resulting in displacement of the valve stem 848. In this manner, rotational forces are employed against a valve stem in order to displace the valve stem and subsequently displace the valve head from a valve seat. While the embodiment of the lockable assembly 840 illustrated in FIG. 12 shows a clockwise rotation of the cam 813, it should be appreciated that in other embodiments, the cam 813 can be rotated in a counter-clockwise direction.

Figure 13:
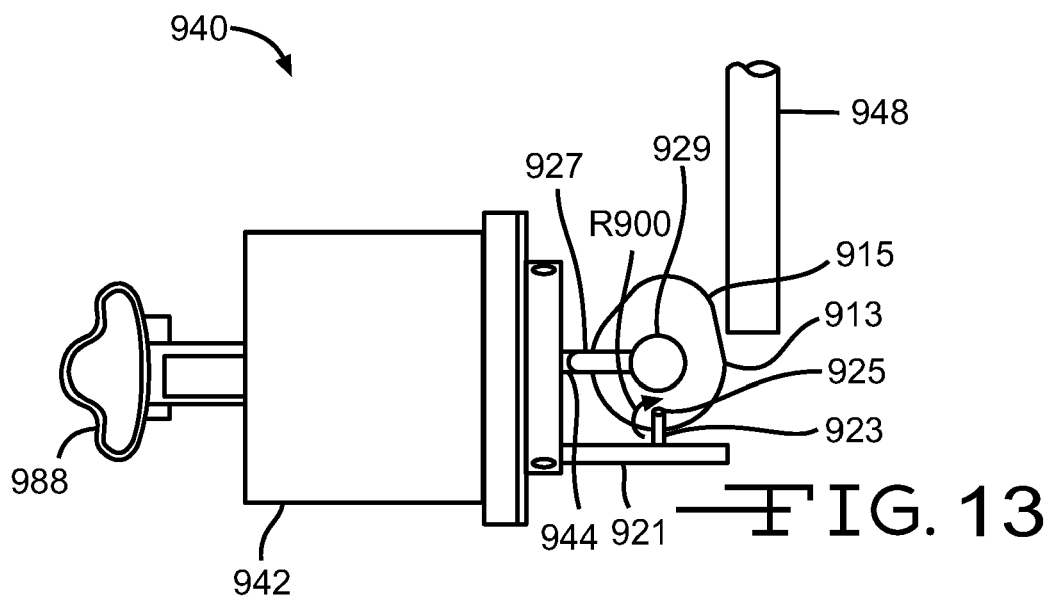
FIG. 13 is a side view, in elevation, of another embodiment of a lockable assembly.

Referring now to FIG. 13, another embodiment of a lockable assembly is shown generally at 940. The lockable assembly 940 includes an index pin 944 extending from a housing body 942. In the illustrated embodiment, the housing body 942 and the index pin 944 are the same as, or similar to, the housing body 542 and index pin 544 discussed above and shown in FIG. 9. However, in other embodiments, the housing body 942 and the index pin 944 can be different from the housing body 542 and index pin 544.

Referring again to FIG. 13, a first support 921 is attached to and extends from the housing body 942. A second support 923 is attached to and extends from the first support 921. A first axle 925 is attached to an upper end of the second support 923. The first axle 925 will be discussed in more detail below.

Referring again to FIG. 13, a yoke 927 is attached to the index pin 944 such that axial movement of the index pin 944 causes axial movement of the yoke 927. The yoke 927 includes a second axle 929. A cam 913 is attached to the second axle 929 of the yoke 927 and to the first axle 925 connected to the second support 923, such that axial movement of the yoke 927 causes rotation of the cam 913 about the first axle 925 as shown by direction arrow R900. The cam 913 includes a cam lobe 915. The cam lobe 915 is positioned on the cam 913 such as to contact a valve stem 948 as the cam 913 rotates.

In operation, axial movement of the index pin 944, as caused by user activation, causes rotation of the cam 913. Rotation of the cam 913 urges the cam lobe 915 into contact with the valve stem 948. Continued rotation of the cam 913 causes the cam lobe 915 to exert a force against the valve stem 948, thereby resulting in displacement of the valve stem 948. In this manner, both axial and rotational forces are employed against a valve stem in order to displace the valve stem and subsequently displace the valve head from a valve seat.

While the embodiment of the lockable assembly 940 shown in FIG. 13 provides for the cam 913 to be positioned in a substantially vertical orientation, it should be appreciated that in other embodiments, the cam 913 can have other orientations, such as for example, a substantially horizontal orientation, sufficient to contact and displace the valve stem 948.

Figure 14:
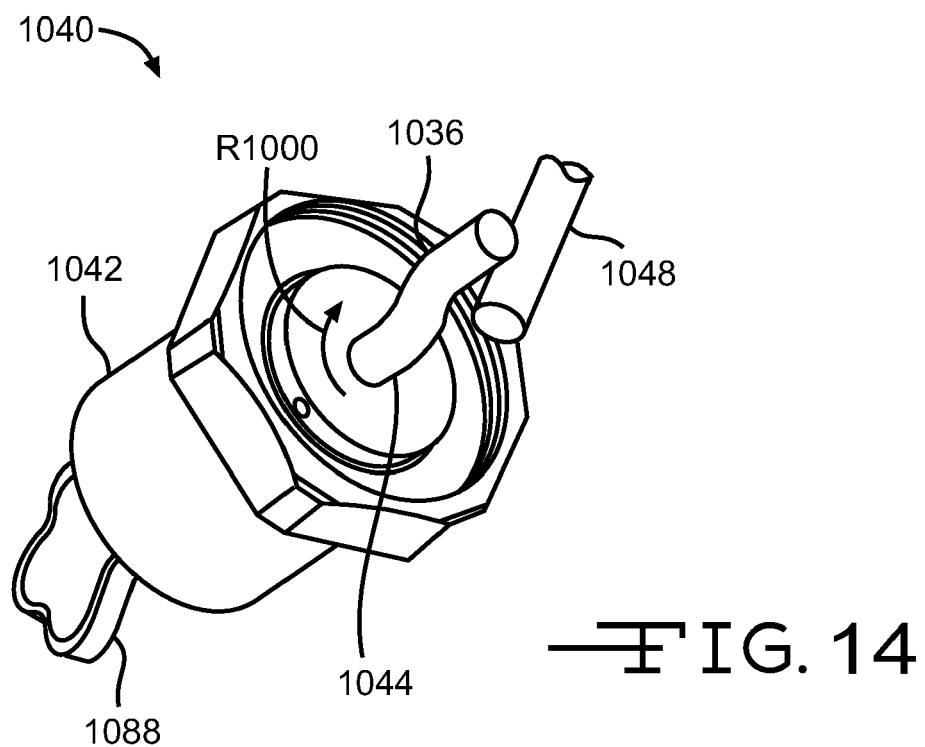
FIG. 14 is a perspective view of another embodiment of a lockable assembly.

Referring now to FIG. 14, another embodiment of a lockable assembly is shown generally at 1040. The lockable assembly 1040 includes an index pin 1044 extending from a housing body 1042. In the illustrated embodiment, the housing body 1042 and the index pin 1044 are the same as, or similar to, the housing body 542 and index pin 544 discussed above and shown in FIG. 9. However, in other embodiments, the housing body 1042 and the index pin 1044 can be different from the housing body 542 and index pin 544.

Referring again to FIG. 14, the index pin 1044 includes an offset segment 1036. The offset segment 1036 is configured such that clockwise rotation of the index pin 1044 causes clockwise rotation of the offset segment 1036 as shown by direction arrow R1000. The offset segment 1036 of the index pin 1044 is configured to contact a valve stem 1048 as the index pin 1044 rotates.

In operation, rotation of the index pin 1044, as caused by a key 1088, causes rotation of the offset segment 1036. Rotation of the offset segment 1036 urges the offset segment 1036 into contact with the valve stem 1048. Continued rotation of the index pin 1044 causes the offset segment 1036 to exert a force against the valve stem 1048, thereby resulting in displacement of the valve stem 1048. In this manner, rotational forces are employed against a valve stem in order to displace the valve stem 1048 and subsequently displace the valve head from a valve seat. While the embodiment of the lockable assembly 1040 illustrated in FIG. 14 shows a clockwise rotation of the index pin 1044, it should be appreciated that in other embodiments, the index pin 1044 can be rotated in a counter-clockwise direction.

Figure 15:
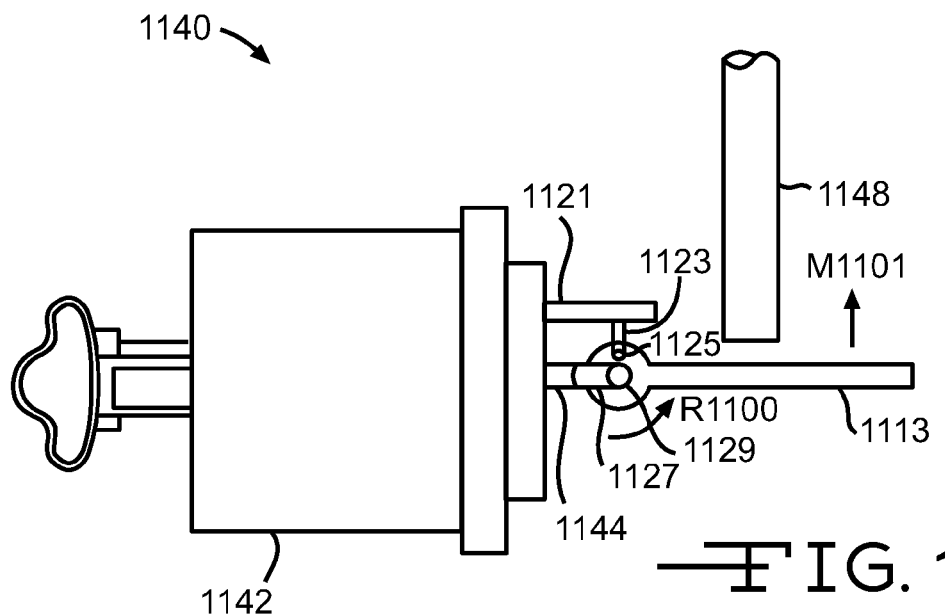
FIG. 15 is a side view, in elevation, of another embodiment of a lockable assembly.

Referring now to FIG. 15, another embodiment of a lockable assembly is shown generally at 1140. The lockable assembly 1140 includes an index pin 1144 extending from a housing body 1142. In the illustrated embodiment, the housing body 1142 and the index pin 1144 are the same as, or similar to, the housing body 542 and index pin 544 discussed above and shown in FIG. 9. However, in other embodiments, the housing body 1142 and the index pin 1144 can be different from the housing body 542 and index pin 544.

Referring again to FIG. 15, a first support 1121 is attached to and extends from the housing body 1142. A second support 1123 is attached to and extends from the first support 1121. A first axle 1125 is attached to a lower end of the second support 1123. The first axle 1125 will be discussed in more detail below.

Referring again to FIG. 15, a yoke 1127 is attached to the index pin 1144 such that axial movement of the index pin 1144 causes axial movement of the yoke 1127. The yoke 1127 includes a second axle 1129. An arm 1113 is attached to the second axle 1129 of the yoke 1127 and to the first axle 1125 connected to the second support 1123 such that axial movement of the yoke 1127 causes rotation of the arm 1113 about the first axle 1125 as shown by direction arrow R1100. The arm 1113 is positioned such as to move in a substantially vertical direction as shown by direction arrow M1101 and contact an end portion of a valve stem 1148 as the arm 1113 rotates.

In operation, axial movement of the index pin 1144, as caused by user activation, causes rotation of the arm 1113 in the direction M1101. Rotation of the arm 1113 urges the arm 1113 into contact with the valve stem 1148. Continued rotation of the arm 1113 causes the arm 1113 to exert a substantially vertical force against the valve stem 1148, thereby resulting in displacement of the valve stem 1148. In this manner, rotational and vertical forces are employed against a valve stem in order to displace the valve stem and subsequently displace the valve head from a valve seat.

While the embodiment of the lockable assembly 1140 shown in FIG. 15 provides for the arm 1113 to be positioned substantially below the valve stem 1148, it should be appreciated that in other embodiments, the arm 1113 can be positioned in other location, sufficient to contact and displace the valve stem 1148.

Figure 16:
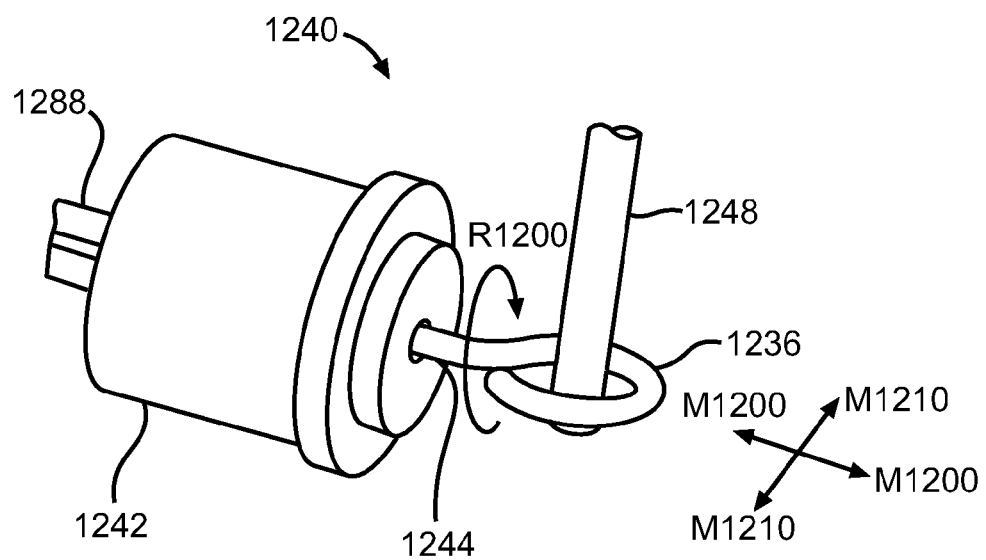
FIG. 16 is a perspective view of another embodiment of a lockable assembly.

Referring now to FIG. 16, another embodiment of a lockable assembly is shown generally at 1240. The lockable assembly 1240 includes an index pin 1244 extending from a housing body 1242. In the illustrated embodiment, the housing body 1242 and the index pin 1244 are the same as, or similar to, the housing body 542 and index pin 544 discussed above and shown in FIG. 9. However, in other embodiments, the housing body 1242 and the index pin 1244 can be different from the housing body 542 and index pin 544.

Referring again to FIG. 16, the index pin 1244 includes an extended segment 1236. The extended segment 1236 is configured such that movement of the index pin 1244, including the non-limiting examples of axial movement as shown by direction arrows M1200, rotational movement as shown by direction arrow R1200 and lateral movement as shown by direction arrows M1210, translates into movement of the extended segment 1236. The extended segment 1236 is further configured to substantially encircle a valve stem 1248. Accordingly, any movement of the index pin 1244 causes corresponding movement of the extended segment 1236, thereby causing contact with, and displacement of the valve stem 1248.

In operation, axial movement or rotation of the index pin 1244, as caused by a key 1288 or displacement by a user, causes movement of the extended segment 1236. Movement of the extended segment 1236 urges the extended segment 1236 into contact with the valve stem 1248. Continued rotation of the index pin 1244 causes the extended segment 1236 to exert a force against the valve stem 1248, thereby resulting in displacement of the valve stem 1248. In this manner, any force, such as rotational or axial can be employed against a valve stem in order to displace the valve stem and subsequently displace the valve head from a valve seat. While the embodiment of the lockable assembly 1240 illustrated in FIG. 16 shows the extended segment 1236 as substantially encircling the valve stem 1248, it should be appreciated that in other embodiments, the extended segment 1236 can have other forms and can even be connected to the valve stem 1248.

Figure 17:
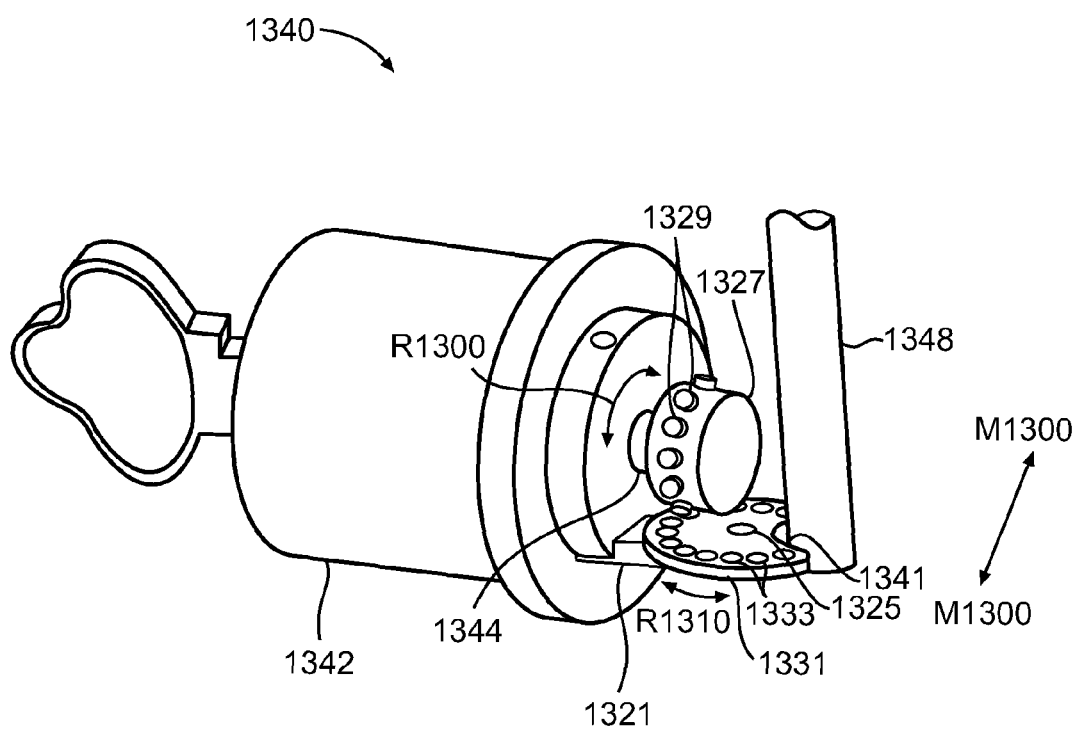
FIG. 17 is a perspective view of another embodiment of a lockable assembly.

Referring now to FIG. 17, another embodiment of a lockable assembly is shown generally at 1340. The lockable assembly 1340 includes an index pin 1344 extending from a housing body 1342. In the illustrated embodiment, the housing body 1342 and the index pin 1344 are the same as, or similar to, the housing body 542 and index pin 544 discussed above and shown in FIG. 9. However, in other embodiments, the housing body 1342 and the index pin 1344 can be different from the housing body 542 and index pin 544.

Referring again to FIG. 17, a first disc 1327 is attached to the index pin 1344 such that rotational movement of the index pin 1344 causes rotational movement of the first disc 1327. The first disc 1327 includes a plurality of spaced apart nubs 1329 positioned circumferentially along the outer radial edge of the first disc 1327. The first disc 1327 and the nubs 1329 will be discussed in more detail below.

Referring again to FIG. 17, a support 1321 is attached to and extends from the housing body 1342. An axle 1325 is attached to an outer end of the support 1321. The axle 1325 is configured to support a second disc 1331 as the second disc 1331 rotates about the axle 1325. The second disc 1331 includes a plurality of spaced apart apertures 1333. The apertures 1333 are configured to coordinate with the nubs 1329 on the first disc 1327, such that rotational movement of the first disc 1327, as shown by direction arrow R1300, and the nubs 1329 causes rotational movement of the second disc 1331 as shown by direction arrow R1310.

The second disc 1331 includes a cutout 1341. The cutout 1341 has a cross-sectional shape that generally corresponds to the cross-sectional shape of a valve stem 1348, such that the valve stem 1348 can be substantially positioned within the cross-sectional shape of the cutout 1341. The cutout 1341 and the valve stem 1348 are positioned relative to each other such that the edges of the cutout 1341 contact and displace the valve stem 1348 as the second disc 1331 rotates.

In operation, rotational movement of the index pin 944, causes rotation of the index pin 1344. Rotation of the index pin 1344 causes rotation of the first disc 1327, thereby causing engagement of the nubs 1329 with the apertures of the second disc 1331. Engagement of the nubs 1329 with the apertures of the second disc 1331 causes the second disc 1331 to rotate about the axle 1325, thereby causing the edges of the cutout 1341 into contact with the valve stem 1348. Continued rotation of the second disc 1331 causes the edges of the cutout 1341 to exert a force against the valve stem 1348, thereby resulting in displacement of the valve stem 1348. In this manner, rotational forces are employed against a valve stem in order to displace the valve stem and subsequently displace the valve head from a valve seat.

While the embodiment of the lockable assembly 1340 shown in FIG. 17 includes the first disc 1327, a plurality of nubs 1329 and a corresponding second disc 1331, it should be appreciated that in other embodiments, other mechanisms and devices having a gear-based actuation method sufficient to contact and displace the valve stem 1348 can be used.

The principle and mode of operation of the lockable assembly for a flush valve have been described in certain embodiments. However, it should be noted that the lockable assembly for a flush valve may be practiced otherwise than as specifically illustrated and described without departing from its scope.

What is claimed is:

1. A lockable assembly for a urinal valve, the lockable assembly comprising:
  a shaft assembly configured to displace portions of the urinal valve; and
  a housing body configured to connect to the urinal valve and further configured to support the shaft assembly;
  wherein the lockable assembly is configured to allow selective operation of the urinal valve between an unlocked flushable state and a locked non-flushable state, wherein in the locked non-flushable state, the shaft assembly is prevented from displacing portions of the urinal valve and in the unlocked flushable state, the shaft assembly is configured to displace portions of the urinal valve to allow a flow of water to pass through the urinal valve.

2. The lockable assembly of claim 1, wherein the shaft assembly can move within the housing body in a rotational direction.

3. The lockable assembly of claim 2, wherein the shaft assembly can further move within the housing body in an axial direction.

4. The lockable assembly of claim 1, wherein rotation of the shaft assembly moves the shaft assembly from the locked non-flushable state to the unlocked flushable state.

5. The lockable assembly of claim 3, wherein the axial movement of the shaft assembly is manually actuated.

6. The lockable assembly of claim 1, wherein the shaft assembly is configured for the locked non-flushable position as the result of a locking pin aligning with a groove in the shaft assembly.

7. The lockable assembly of claim 1, wherein the lockable assembly is configured to replace a lever operated flush valve system.

8. The lockable assembly of claim 1, wherein the lockable assembly is incorporated into an automatic flush valve system.

9. The lockable assembly of claim 1, wherein the lockable assembly is incorporated into an automatic flush valve system having an existing manual push button.

10. The lockable assembly of claim 1, wherein the shaft assembly includes a retainer cap, an index pin and a tension member.

11. The lockable assembly of claim 1, wherein a plurality of sealing members are positioned within the housing body.

12. The lockable assembly of claim 8, wherein the shaft assembly is configured to mate with a key and wherein the key can be used to initiate rotational movement of the shaft assembly.

13. The lockable assembly of claim 1, wherein the shaft assembly is configured to automatically return to a locked non-flushable state after contact with portions of the urinal valve.

14. A urinal comprising:
 a receptacle configured to collect fluids;
 a valve in fluid communication with the receptacle, the valve configured to provide a flushing system for rinsing fluids from surfaces of the receptacle; and
 a lockable assembly engaged with portions of the valve, the lockable assembly having a shaft assembly configured to displace portions of the valve and a housing body configured to connect to the valve and further configured to support the shaft assembly, wherein the lockable assembly is configured to allow selective operation of the valve between an unlocked flushable state and a locked non-flushable state, wherein in the locked non-flushable state, the shaft assembly is prevented from displacing portions of the valve and in an unlocked flushable state, the shaft assembly is configured to displace portions of the valve to allow a flow of water to pass through the valve and into the urinal.

15. The lockable assembly of claim 14, wherein the shaft assembly can move within the housing body in a rotational direction.

16. The lockable assembly of claim 14, wherein rotation of the shaft assembly moves the shaft assembly from the locked non-flushable state to the unlocked flushable state.

17. The urinal of claim 14, wherein the shaft assembly is configured for the locked non-flushable position as the result of a locking pin aligning with a groove in the shaft assembly.

18. The lockable assembly of claim 14, wherein the shaft assembly includes a retainer cap, an index pin and a tension member.

19. The urinal of claim 14, wherein more than one sealing member is seated on the shaft assembly, and wherein the more than one sealing members are positioned within the housing body.

20. A method of controlling the flush valve of a urinal, the method comprising the steps of:
 engaging the flush valve with a lockable assembly, the lockable assembly having a shaft assembly configured to displace portions of the flush valve;
 controlling the operation of the lockable assembly between a manually-operable unlocked flushable state and a locked non-flushable state, wherein in the locked non-flushable state, the shaft assembly is prevented from displacing portions of the flush valve and in the unlocked flushable state, the shaft assembly is configured to displace portions of the flush valve to allow a flow of water to pass through the flush valve.

* * * * *